(12) United States Patent
Nakagawa et al.

(10) Patent No.: US 7,763,393 B2
(45) Date of Patent: Jul. 27, 2010

(54) FUEL CELL HAVING ELECTRODE CHANNEL MEMBER WITH COMB-TEETH SHAPE

(75) Inventors: Kazuhiko Nakagawa, Niihari-gun (JP); Masahiro Seido, Tsuchiura (JP); Mineo Washima, Tsuchiura (JP); Takaaki Sasaoka, Tsuchiura (JP); Kunihiro Fukuda, Tsukuba (JP); Katsumi Nomura, Tsuchiura (JP)

(73) Assignee: Hitachi Cable, Ltd., Tokyo (JP)

( * ) Notice: Subject to any disclaimer, the term of this patent is extended or adjusted under 35 U.S.C. 154(b) by 1110 days.

(21) Appl. No.: 11/432,719

(22) Filed: May 12, 2006

(65) Prior Publication Data
US 2006/0269821 A1 Nov. 30, 2006

(30) Foreign Application Priority Data
May 13, 2005 (JP) ............................. 2005-141688

(51) Int. Cl.
*H01M 8/10* (2006.01)
*H01M 8/02* (2006.01)

(52) U.S. Cl. .................. 429/514; 429/479; 429/512
(58) Field of Classification Search .................. None
See application file for complete search history.

(56) References Cited

U.S. PATENT DOCUMENTS

| 4,769,296 | A | * | 9/1988 | Sterzel | 429/12 |
|---|---|---|---|---|---|
| 6,194,095 | B1 | * | 2/2001 | Hockaday | 429/34 |
| 2003/0012999 | A1 | * | 1/2003 | Yoshioka et al. | 429/34 |
| 2003/0022052 | A1 | * | 1/2003 | Kearl | 429/34 |
| 2003/0120320 | A1 | * | 6/2003 | Solom | 607/36 |
| 2004/0131907 | A1 | * | 7/2004 | Arita et al. | 429/30 |
| 2005/0031926 | A1 | * | 2/2005 | Sugimasa et al. | 429/30 |

FOREIGN PATENT DOCUMENTS

| CA | 2 370 905 A1 | 11/2000 |
|---|---|---|
| JP | 10-228914 A | 8/1998 |
| JP | 2002-175817 A | 6/2002 |
| JP | 2002-544650 A | 12/2002 |

\* cited by examiner

*Primary Examiner*—Dah-Wei D Yuan
*Assistant Examiner*—Katherine Turner
(74) *Attorney, Agent, or Firm*—Foley & Lardner LLP

(57) ABSTRACT

A fuel cell having: a fuel electrode and an oxidant electrode disposed to sandwich a solid polymer electrolyte membrane; current collecting plates disposed outside of the fuel electrode and the oxidant electrode; a fuel electrode channel member disposed outside of the current collecting plate disposed outside of the fuel electrode; and an oxidant electrode channel member disposed outside of the current collecting plate disposed outside of the oxidant electrode. The oxidant electrode channel member has a thickness of not less than 1.2 mm. The fuel cell is a direct methanol type fuel cell.

12 Claims, 20 Drawing Sheets

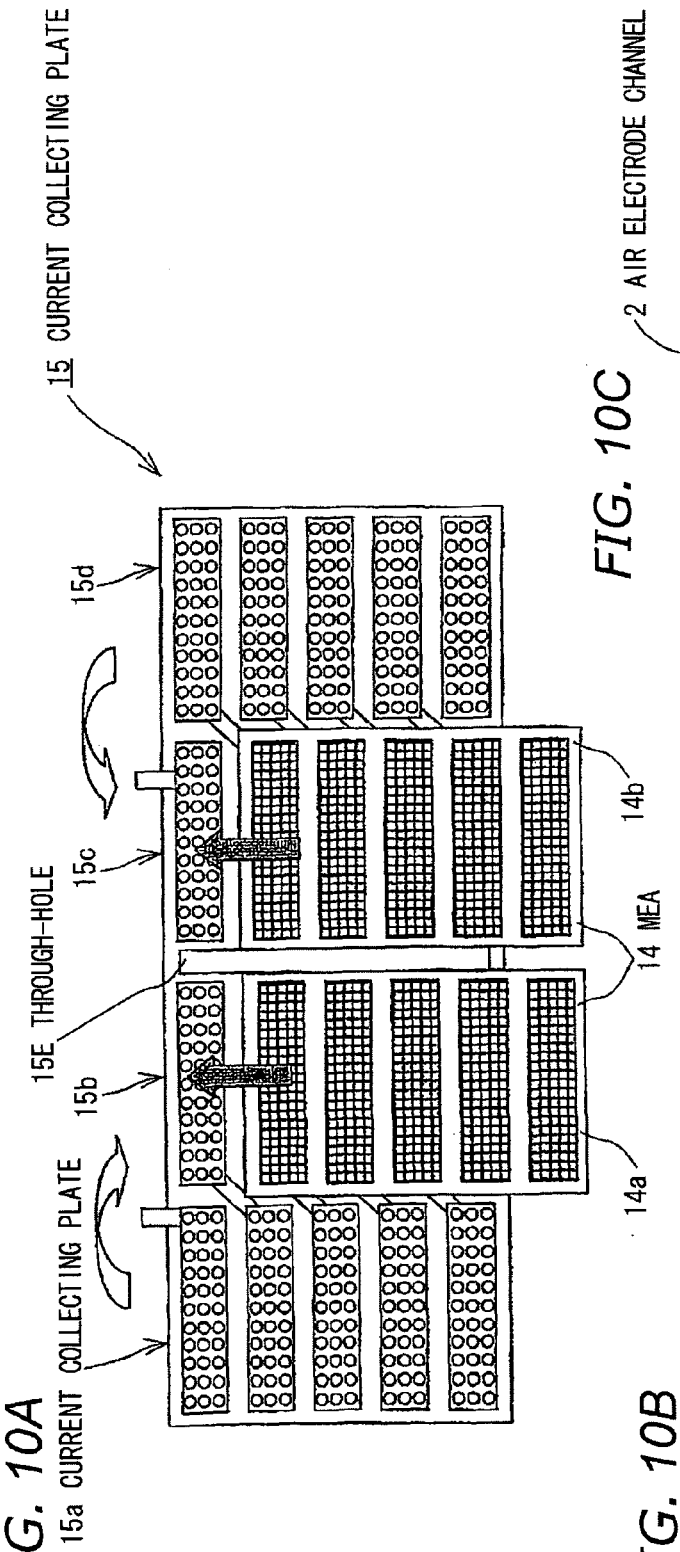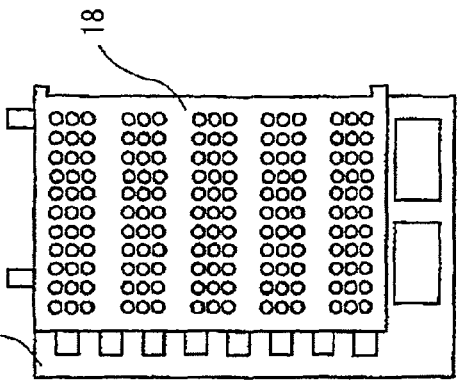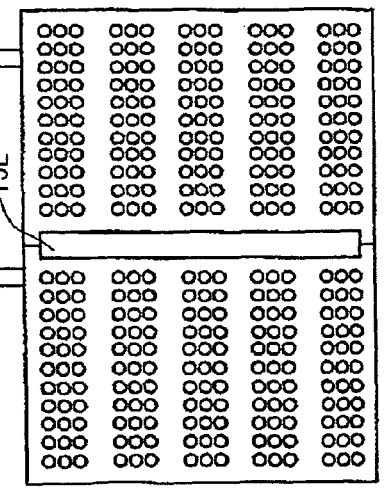

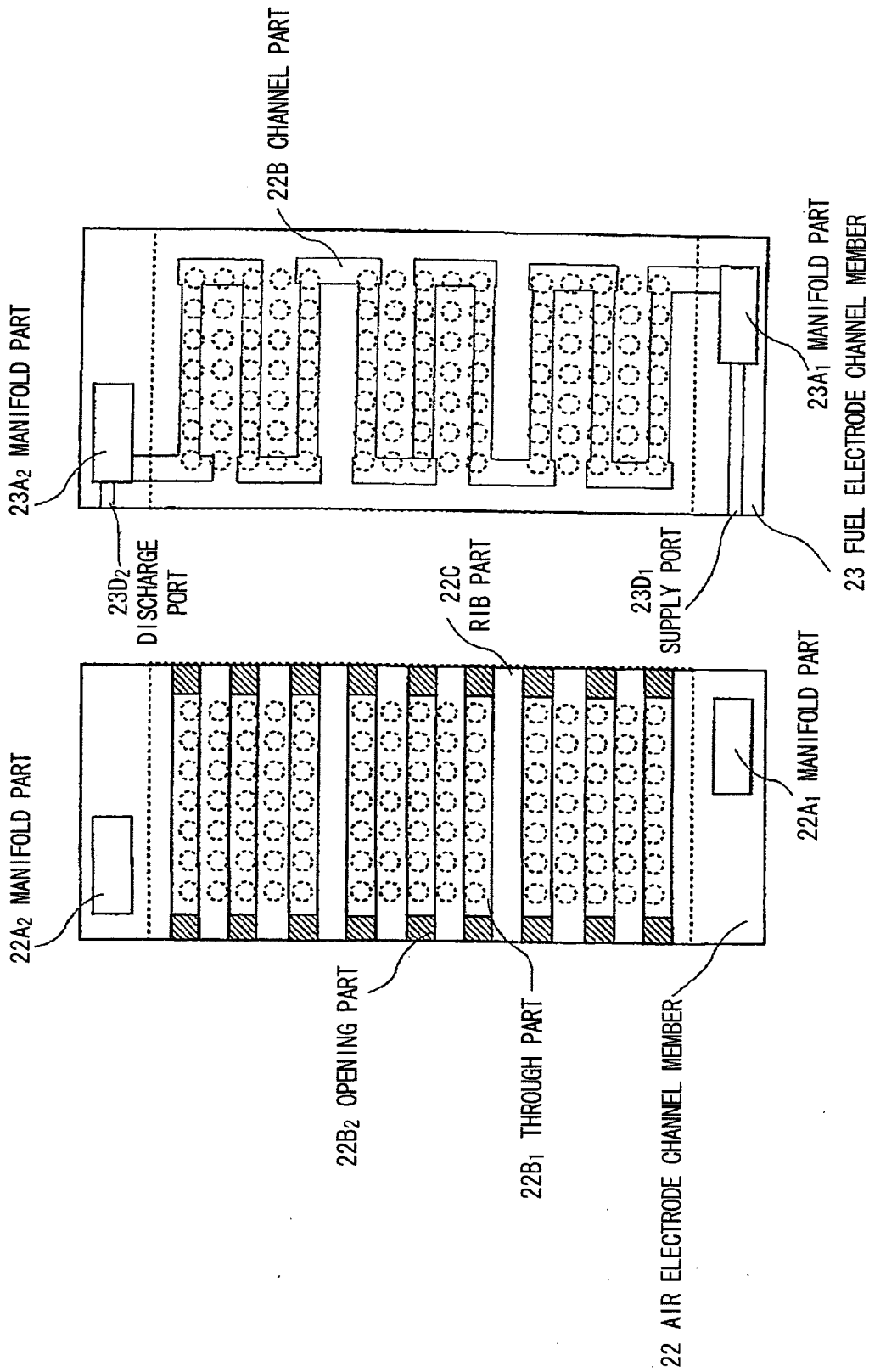

42 FIRST AIR ELECTRODE CHANNEL MEMBER

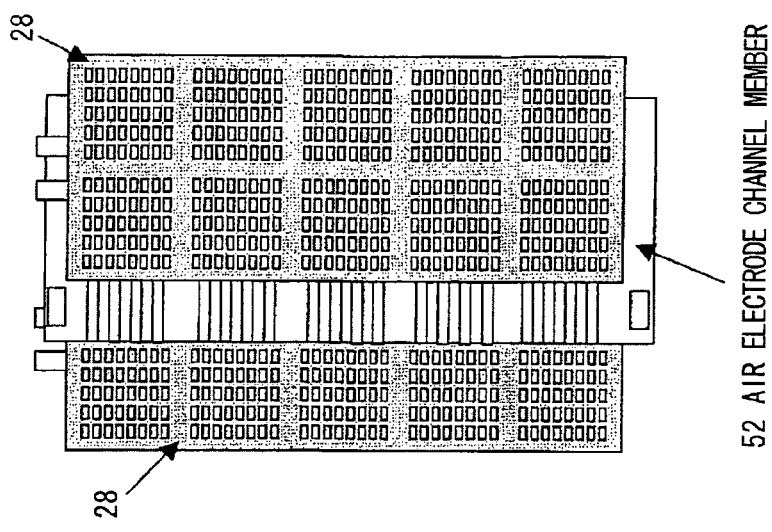
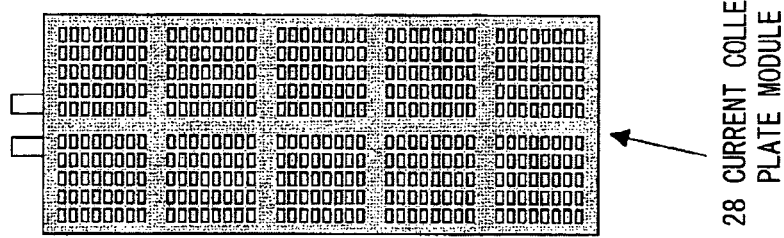
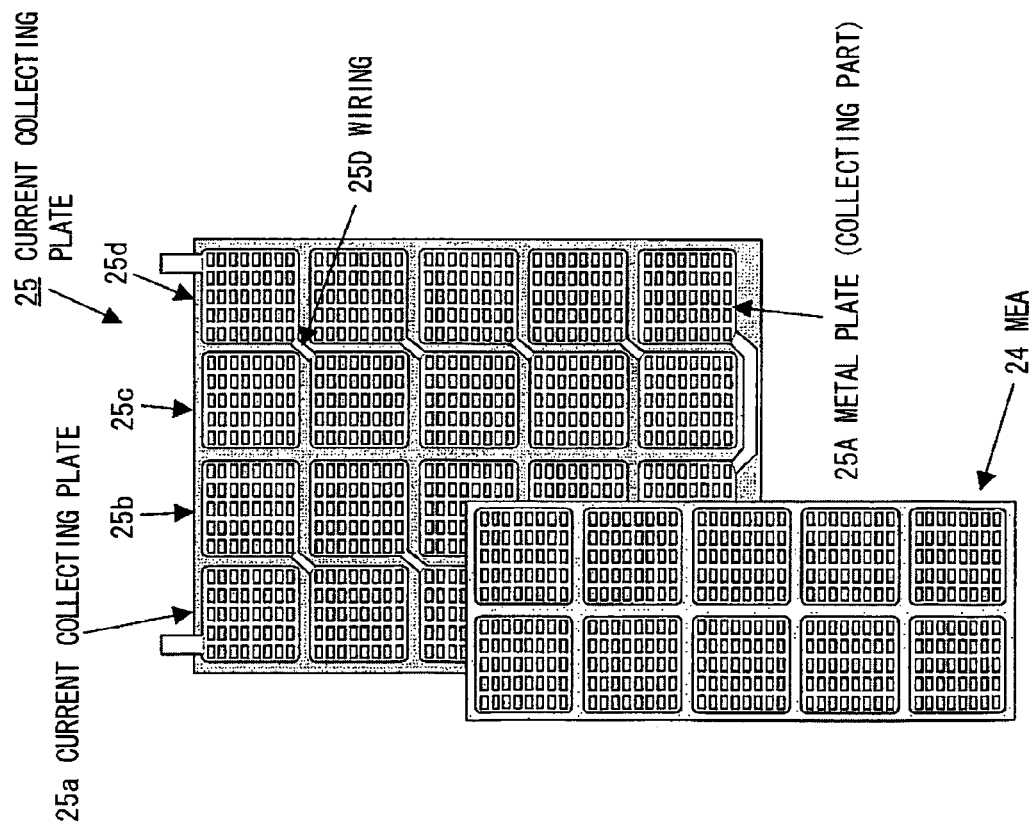

FUEL CELL HAVING ELECTRODE CHANNEL MEMBER WITH COMB-TEETH SHAPE

The present application is based on Japanese patent application No. 2005-141688, the entire contents of which are incorporated herein by reference.

BACKGROUND OF THE INVENTION

1. Field of the Invention

This invention relates to a solid polymer electrolyte fuel cell and, in particular, to a solid polymer electrolyte fuel cell comprising a cell structure that even an auxiliary machine (a supply device) with low electric power consumption can be used to supply air as an oxidant gas.

2. Description of the Related Art

Fuel cells are highly efficient since they are capable of directly transforming a chemical change into electrical energy, and they are global environment-friendly because they exhaust only a small amount of air pollutant ($NO_x$, $SO_x$ etc.) since they are operable without burning a fuel containing nitrogen, sulfur etc. The fuel cells include various types, i.e., a polymer electrolyte fuel cell (PEFC), a phosphoric acid fuel cell (PAFC), a molten carbonate fuel cell (MCFC), a solid oxide fuel cell (SOFC) etc. Among others, the polymer electrolyte fuel cell (PEFC) is expected to be widely used as a power source for automobiles and home, as a power source for mobile devices and as uninterruptible power source in the future.

FIG. 16 is a schematic view showing a principle of power generation in a fuel cell using methanol as a liquid fuel. This is called a direct methanol type fuel cell (DMFC).

In the DMFC, methanol being mixed with water is supplied into a fuel electrode, being ionized into hydrogen ions by a catalyst while generating carbon dioxide ($CO_2$) gas. The hydrogen ions move to a counter electrode side of the solid polymer electrolyte membrane. Then, on an air electrode (=oxidant electrode), electrons generated at the ionization, oxygen as an oxidant and the hydrogen ions react to create water. These sequential reactions allow generation of electric power, whereby electrical energy can be taken out from the fuel cell.

The liquid fuel and air (=oxidant gas) are each supplied to the respective electrodes through a channel member comprising a channel that allows the respective substances to pass through, and the channel member serves to discharge the water and gas produced in the power generation.

FIG. 17 is a schematic view showing the structure of a conventional fuel cell (DMFC). The fuel cell 101 comprises: a solid polymer electrolyte membrane 110; a fuel electrode 111 disposed on one surface of the solid polymer electrolyte membrane 110; an air electrode (=oxidant electrode) 112 disposed on another surface of the solid polymer electrolyte membrane 110 while forming MEA (=membrane of electrolyte assembly) 113 together with the solid polymer electrolyte membrane 110 and the fuel electrode 111; a metal separator (bipolar plate) 115 formed to provide plural fuel channels 114 on one surface of the MEA 113; a metal separator (bipolar plate) 117 formed to provide plural air (oxidant gas) channels 116 on another surface of the MEA 113; and gaskets 118, 119 as a sealant to seal the periphery of the MEA 113 while being interposed between the metal separators 115 and 117. In general, the plural fuel cells 101 are stacked to increase the output of power.

FIG. 18 is a cross sectional view schematically showing a stack structure in the conventional fuel cell. In the conventional fuel cell, the fuel electrode (i.e., anode, shown as "−" in FIG. 18) and the air electrode (i.e., cathode, shown as "+" in FIG. 18) are disposed alternately, i.e., in series.

The DMFC is expected to be used for compact sized mobile devices, which use a secondary cell at present, because it can take out electrical energy by using methanol as a liquid fuel, and it has been practically used in some areas. On the other hand, the PEFC using hydrogen gas as a fuel has been recently considered to be used for automobiles. In the PEFC, to supply hydrogen gas, for example, a reformer is used to produce hydrogen containing gas from methanol or natural gas. However, the cell system must be so large that it cannot be suited to mobile devices.

In contrast, the DMFC has a possibility that its cell system can be considerably downsized because it is capable of taking out hydrogen ions directly from methanol. However, since the DMFC has a lower output density than the PEFC using hydrogen gas as a fuel, the application of DMFC is limited to devices with low electric power consumption at present. In the DMFC, other liquid fuels than methanol such as dimethylether can be used, and the practical use of each liquid fuel has been studied (e.g., JP-A-2002-175817).

JP-A-2002-175817 discloses a fuel cell (DMFC) that a channel is formed to exhaust carbon dioxide ($CO_2$) produced during the power generation on its fuel electrode side so that an equipment for gas-liquid separation becomes unnecessary, whereby the DMFC system can be simplified and be downsized.

In the conventional fuel cell with the stack structure as shown in FIG. 18, there is a demerit that a feeding channel for fuel/oxidant and a discharging channel for exhaust are complicated in structure since the fuel and oxidant must be separately supplied between neighboring fuel cells in order not to be mixed. In this regard, JP-A-2002-544650 discloses a fuel cell that the cathode side or the anode side of the fuel cell is disposed with a certain distance while facing to each other so as to simplify its distribution structure part for supplying oxidant or fuel.

However, the fuel cell of JP-A-2002-175817 has a problem that the air-feeding channel is not sufficiently secured since it is formed by cutting the surface of a separator (bipolar plate) of mold graphite resin. Therefore, a pressure loss may arise in the channel when air is supplied to the stack structure employed to increase the cell output. Due to this, it is needed to supply the air with a higher pressure than the pressure loss, whereby the power consumption of its supplying pump must be increased. This will cause a problem that the power consumption of its auxiliary machine (=air supply pump) driven by the electric output from the fuel cell must be increased so that the output of the whole fuel cell system is reduced. Thus, for DMFC capable of being downsized, it is a serious problem that the power consumption of the auxiliary machine is increased.

The increase in power consumption of the auxiliary machine is caused by that, in supplying the amount of air required for the power generation of the fuel cell, the pressure loss arises in the fuel cell and therefore the supply pressure has to be increased. If the pressure loss in the channel (particularly the oxidant gas channel) of the fuel cell is reduced, a supply device such as a fan could be chosen as the auxiliary machine for ensuring the sufficient amount of air so as to decrease the power consumption. To achieve this, a cell structure is needed to which the fan can be applied.

As described above (FIG. 18), in the conventional stack structure, the electrodes are disposed in series and the neighboring electrodes are different i.e., the fuel electrode and the air electrode. Thus, substances supplied to the neighboring electrodes are different from each other so that the supplying lines for fuel and air are complicated. This causes an increase in manufacturing cost of the fuel cell.

On the other hand, JP-A-2002-544650 discloses the fuel cell that the cathode side or the anode side of the fuel cell is disposed with a certain distance while facing to each other so as to simplify the distribution structure part for supplying oxidant or fuel. However, because the structure of the channel facing to the cathode and the anode is not disclosed therein, it is not guaranteed whether a pressure loss in the channel (particularly on the cathode side, i.e., on the air electrode side) can be reduced.

SUMMARY OF THE INVENTION

It is an object of the invention to provide a fuel cell that comprises a cell structure to which an auxiliary machine can be applied to supply air as an oxidant gas at low electric power consumption.

According to one aspect of the invention, a fuel cell comprises:

a fuel electrode and an oxidant electrode disposed to sandwich a solid polymer electrolyte membrane;

current collecting plates (hereinafter also simply called collecting plate(s)) disposed outside of the fuel electrode and the oxidant electrode;

a fuel electrode channel member disposed outside of the current collecting plate disposed outside of the fuel electrode; and an oxidant electrode channel member disposed outside of the current collecting plate disposed outside of the oxidant electrode, wherein the fuel electrode and the oxidant electrode are repeatedly stacked such that the fuel electrodes are opposed to each other while sandwiching the fuel electrode channel member and the oxidant electrodes are opposed to each other while sandwiching the oxidant electrode channel member, the current collecting plate comprises a collecting surface comprising a collecting part comprising plural through-holes, and an insulating surface to function as an electrical insulation, and the collecting surface opposed to the fuel electrode or the oxidant electrode and the insulating surface opposed to the fuel electrode channel member or the oxidant electrode channel member, the fuel electrode channel member and the oxidant electrode channel member each allow a fuel and an oxidant to be supplied to the fuel electrode and the oxidant electrode, respectively, through the through-holes of the current collecting plate, and the oxidant electrode channel member comprises a thickness of not less than 1.2 mm.

In the above invention, the following modifications and changes can be made.

(i) The oxidant electrode channel member comprises an oxidant electrode channel to supply the oxidant to the opposed oxidant electrodes, and the oxidant-electrode channel comprises a cross-section area of not less than 1.2 mm$^2$ per one of the oxidant electrode channel part.

(ii) The oxidant electrode channel member comprises a comb-teeth shape to define an oxidant electrode channel.

(iii) The comb-teeth shape is exposed and opened to outside at its both edges to allow the oxidant to enter/exit the oxidant electrode channel.

(iv) The oxidant electrode channel member comprises a through-hole in its thickness direction to define a channel for the oxidant, and an opening part that communicates with the through-hole to allow the oxidant to enter/exit the channel for the oxidant.

(v) The oxidant electrode channel member comprises a rectangle shape in its outermost form, and the oxidant electrode channel member comprises a channel for the oxidant formed parallel to a short side of the rectangle shape.

(vi) The fuel electrode channel member comprises a through-hole in its thickness direction to define a channel for the fuel, and an opening part that communicates with the through-hole to allow the fuel to enter/exit the channel for the fuel.

(vii) The current collecting plate comprises plural metal plates and an insulating sheet of a polymer resin laminated on both surfaces of the metal plate, and the plural current collecting plates are arrayed on a same plane while being disposed at an interval on the insulating sheet.

(viii) The plural current collecting plates arrayed are folded at a connecting part such that they are stacked while sandwiching the fuel electrode and the oxidant electrode therebetween.

(ix) The plural current collecting plates arrayed are folded at a connecting part such that they are stacked while sandwiching the fuel electrode channel member or the oxidant electrode channel member therebetween.

(x) The fuel cell is placed in a package comprising an air fan.

(xi) The fuel cell is a direct methanol type fuel cell.

<Advantages of the Invention>

The invention can provide a fuel cell structure to which an auxiliary machine can be applied to supply air as an oxidant gas at low electric power consumption.

BRIEF DESCRIPTION OF THE DRAWINGS

The preferred embodiments according to the invention will be explained below referring to the drawings, wherein:

FIGS. 10A to 10C are process drawings schematically and partially showing a method of making a fuel cell in Example 2 of the invention;

FIG. 13A is a schematic view showing a stack structure of a current collecting plate shown in FIG. 11 and an air electrode channel member shown in FIG. 12A;

FIG. 13B is a schematic view showing a stack structure of a current collecting plate shown in FIG. 11 and a fuel electrode channel member shown in FIG. 12B;

FIGS. 20A to 20C are process drawings schematically and partially showing a method of making a fuel cell in Example 4 of the invention.

DETAILED DESCRIPTION OF THE PREFERRED EMBODIMENTS

Composition of Fuel Cell

Figure 1:
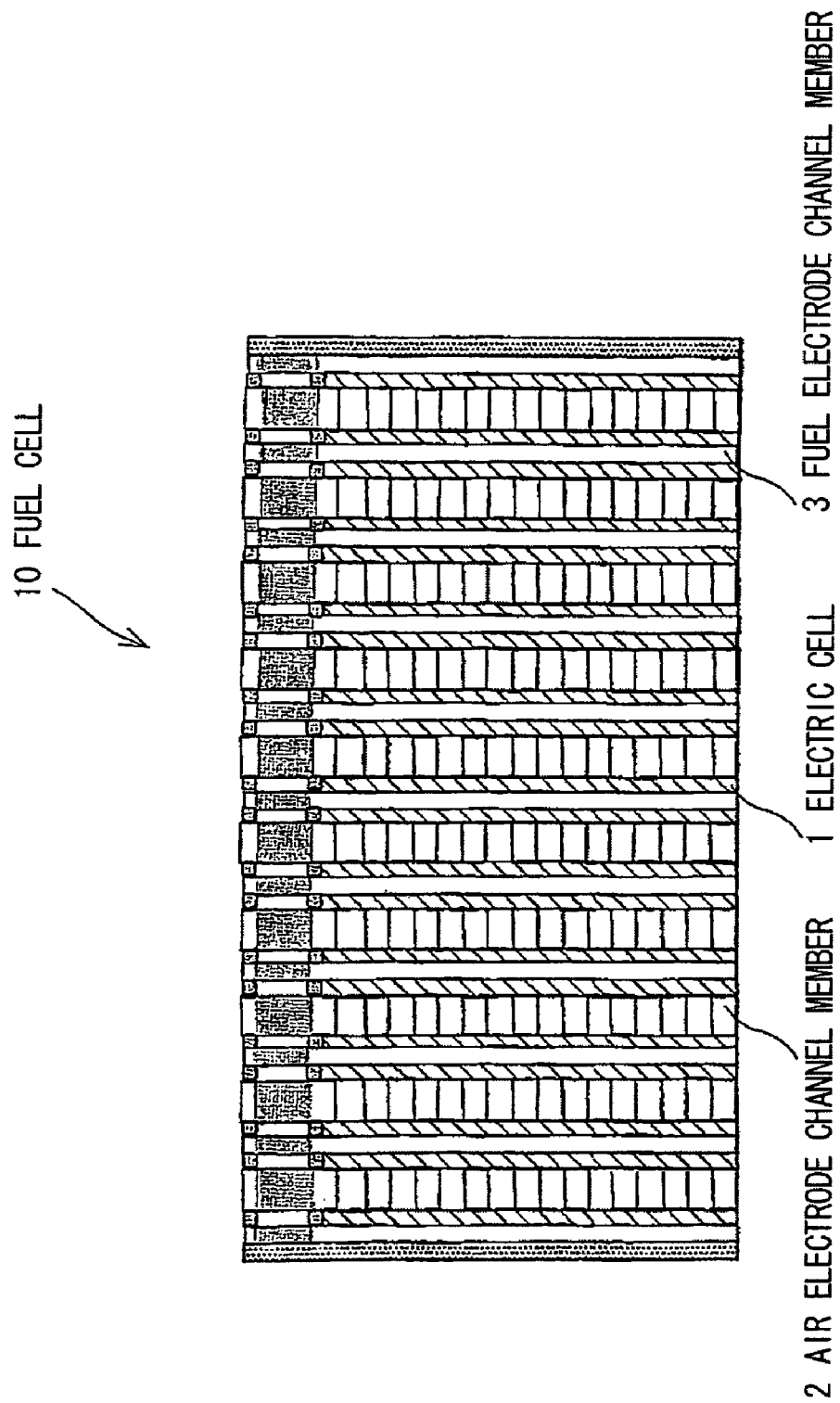
FIG. 1 is a cross sectional view schematically showing a cell structure of a fuel cell in a preferred embodiment according to the invention.

FIG. 1 is a cross sectional view schematically showing a cell structure of a fuel cell in a preferred embodiment according to the invention. As shown in FIG. 1, a fuel cell 10 comprises a electric cell 1, an air electrode channel member 2 of which both sides are sandwiched by the electric cell 1 (in contact with an air electrode side of the electric cell 1), and an fuel electrode channel member 3 of which both sides are sandwiched by the electric cell 1 (in contact with a fuel electrode side of the electric cell 1). That is, the fuel cell 10 comprises a stack structure formed by the air electrode channel member 2, the electric cell 1, the fuel electrode channel member 3, the electric cell 1, the air electrode channel member 2, the electric cell 1, and the fuel electrode channel member 3 being stacked in the order.

Figure 2:
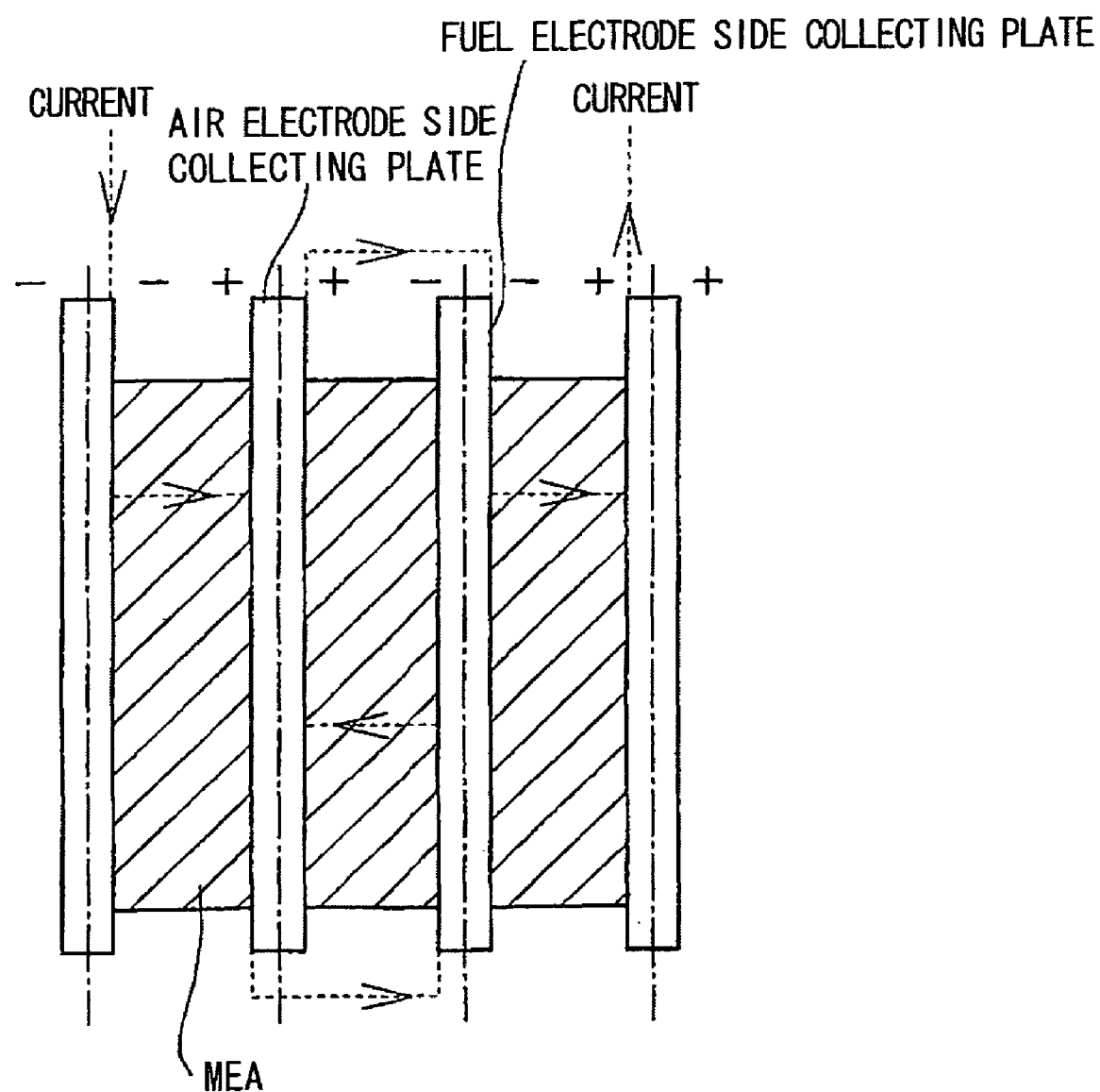
FIG. 2 is a cross sectional view schematically showing a stack structure of a fuel cell in a preferred embodiment according to the invention.

FIG. 2 is a cross sectional view schematically showing a stack structure of a fuel cell in a preferred embodiment according to the invention. As shown in FIG. 2, the preferred embodiment has a characteristic disposition (stack state) of a fuel electrode (anode) and an air electrode (cathode). That is, when the anode (shown as "−" in FIG. 2) and the cathode (shown as "+" in FIG. 2) are stacked, the anodes are disposed as facing to (neighboring) each other, while cathodes are disposed as facing to (neighboring) each other, such as anode, cathode, cathode, anode, anode, cathode, cathode. The anodes disposed as facing to (neighboring) are insulated from each other, and also the cathodes are insulated from each other. Therefore a power collecting wiring is required, shown by an arrowed line in FIG. 2. Meanwhile the channel members are disposed at parts positioned between an air electrode side collecting plate and a fuel electrode side collecting plate, and shown by dashed-dotted lines in FIG. 2.

Composition of Electric Cell

Figure 3:
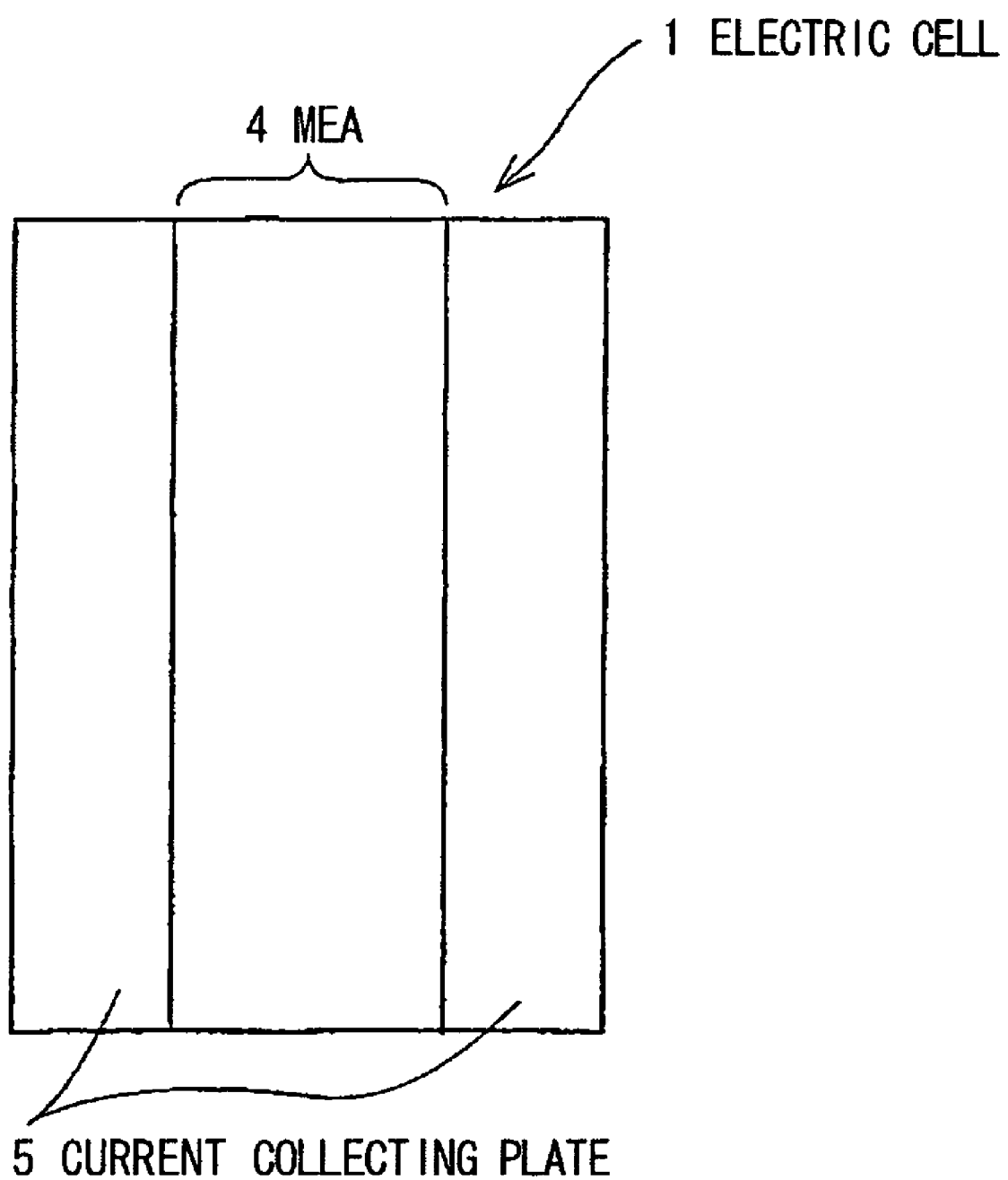
FIG. 3 is a cross sectional view schematically showing a structure of an electric cell constituting a fuel cell in a preferred embodiment according to the invention.

FIG. 3 is a cross sectional view schematically showing a structure of an electric cell constituting a fuel cell in a preferred embodiment according to the invention. As shown in FIG. 3, the electric cell 1 comprises MEA (membrane of electrolyte assembly) 4 which is a complex composed of a polymer electrolyte membrane, a catalyst part, and a gas diffusion (dispersion) layer, and the current collecting plates 5 which sandwiches the MEA 4 therebetween.

Figure 4A:
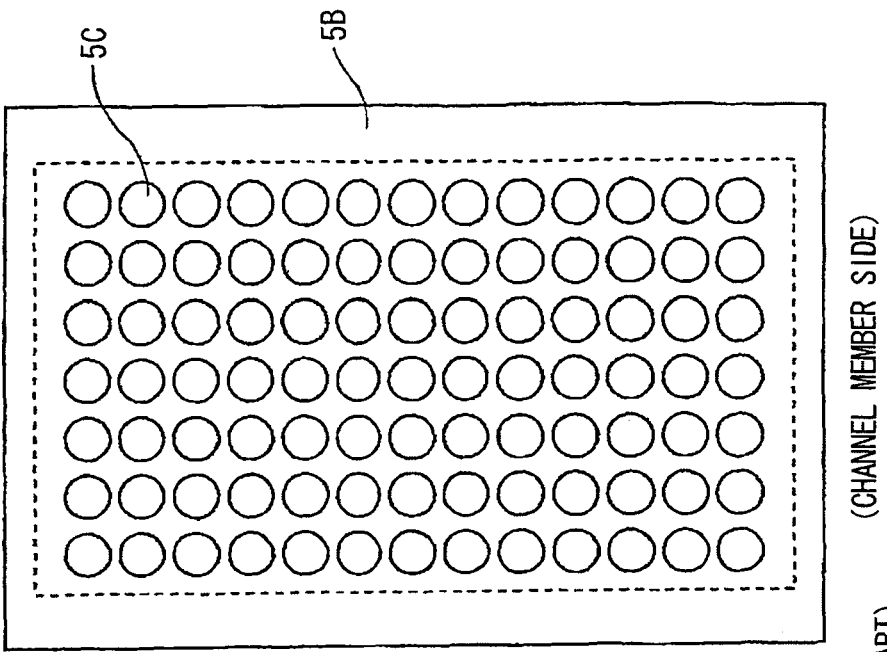
FIG. 4A is a schematic view showing a structure, in a surface contacting MEA, of a current collecting plate constituting an electric cell in a preferred embodiment according to the invention.
Figure 4B:
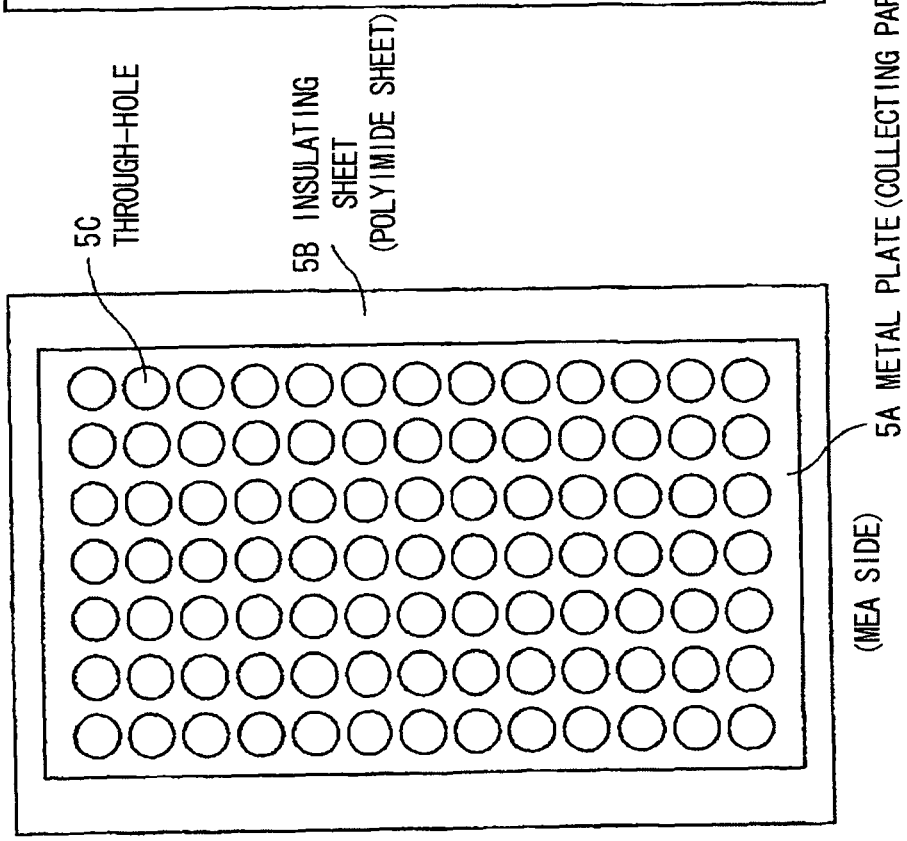
FIG. 4B is a schematic view showing a structure, in a surface contacting a channel member, of a current collecting plate constituting an electric cell in a preferred embodiment according to the invention.

FIG. 4A is a schematic view showing a structure, in a surface contacting MEA, of a current collecting plate constituting an electric cell in a preferred embodiment according to the invention. FIG. 4B is a schematic view showing a structure, in a surface contacting a channel member, of a current collecting plate constituting an electric cell in a preferred embodiment according to the invention.

As shown in FIGS. 4A and 4B, a current collecting plate 5 comprises a metal plate 5A and an insulating sheet 5B of a polymer resin laminated on both surfaces of the metal plate 5A. As shown in FIG. 4A, in the surface contacting the MEA the insulating sheet 5B is removed except for a margin so that the metal plate 5A is exposed as electrically conducted. Also plural through-holes 5C passing through the insulating sheet 5B contacting the channel member, are formed in a collecting part where the metal plate 5A is exposed. Numbers and positions of the through-holes 5C are not limited but it is preferable that small holes, sized to the extent that pressure loss does not increase, are disposed evenly all over the collecting part. Also a shape of the through-holes 5C is not limited to be a round shape, for example, a rectangle shape may be used.

The plural through-holes 5C disposed at the collecting part are passages for supplying liquid fuel to the catalyst part of the MEA 4 in the fuel electrode, and also are passages for discharging carbon dioxide ($CO_2$) produced during the electric generation. On the other hand, the plural through-holes 5C in the air electrode are passages for supplying air to the catalyst part of the MEA 4 in the air electrode, and simultaneously are passages for discharging water produced during the electric generation.

Composition of Channel Member

Figure 5B:
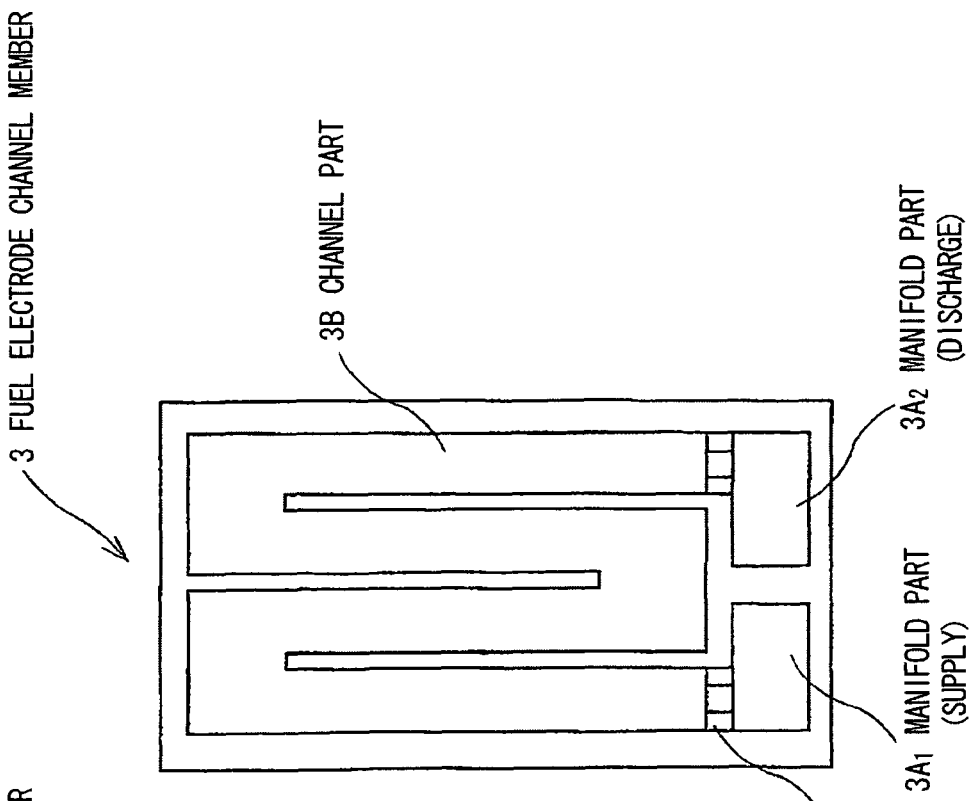
FIG. 5B is a schematic view showing a structure of a fuel electrode channel member constituting a fuel cell in a preferred embodiment according to the invention.
Figure 5A:
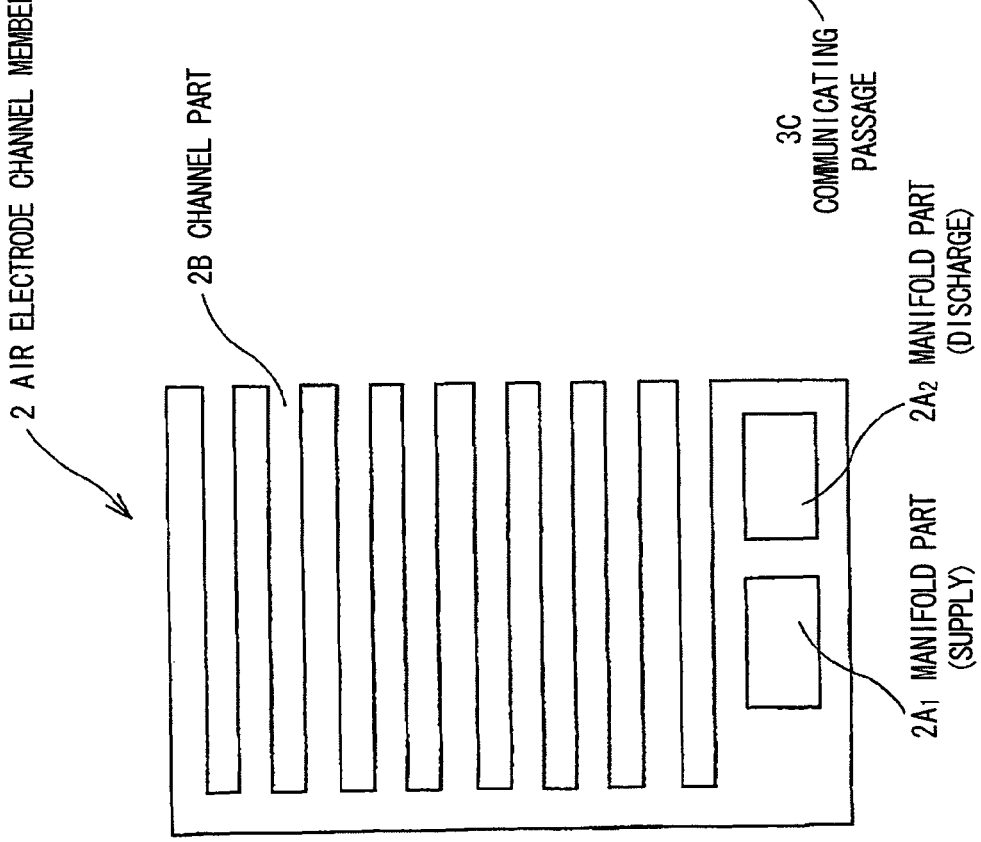
FIG. 5A is a schematic view showing a structure of an air electrode channel member constituting a fuel cell in a preferred embodiment according to the invention.

FIG. 5A is a schematic view showing a structure of an air electrode channel member constituting a fuel cell in a preferred embodiment according to the invention. FIG. 5B is a schematic view showing a structure of a fuel electrode channel member constituting a fuel cell in a preferred embodiment according to the invention.

As shown in FIG. 5A, a manifold part (supply) $2A_1$ and a manifold part (discharge) $2A_2$ for passage of the fuel are formed on edge part in short side of a rectangular plate, and plural channel parts 2B for passage of the air (oxygen) are formed in parallel with the short side and in a comb-teeth shape. The channel parts 2B may be formed in parallel with the long side, but it is preferable that formed in parallel with the short side in order to reduce pressure loss.

Manifold parts $2A_1$, $2A_2$ in a stack state as a fuel cell are communicating with each other in the stack direction (vertical direction relative to paper surface). Also in the air electrode channel member 2, a sealant is disposed around the manifold parts $2A_1$, $2A_2$.

Air supplied to the air electrode channel member 2 is supplied to the air electrode of the electric cell 1 disposed at both sides through the through-holes 5C of the current collecting plate. Air is supplied from parts of the channel part 2B exposed outside in an assembled state as a fuel cell and is exhausted from the opposite parts exposed outside of the fuel cell simultaneously.

Figure 6:
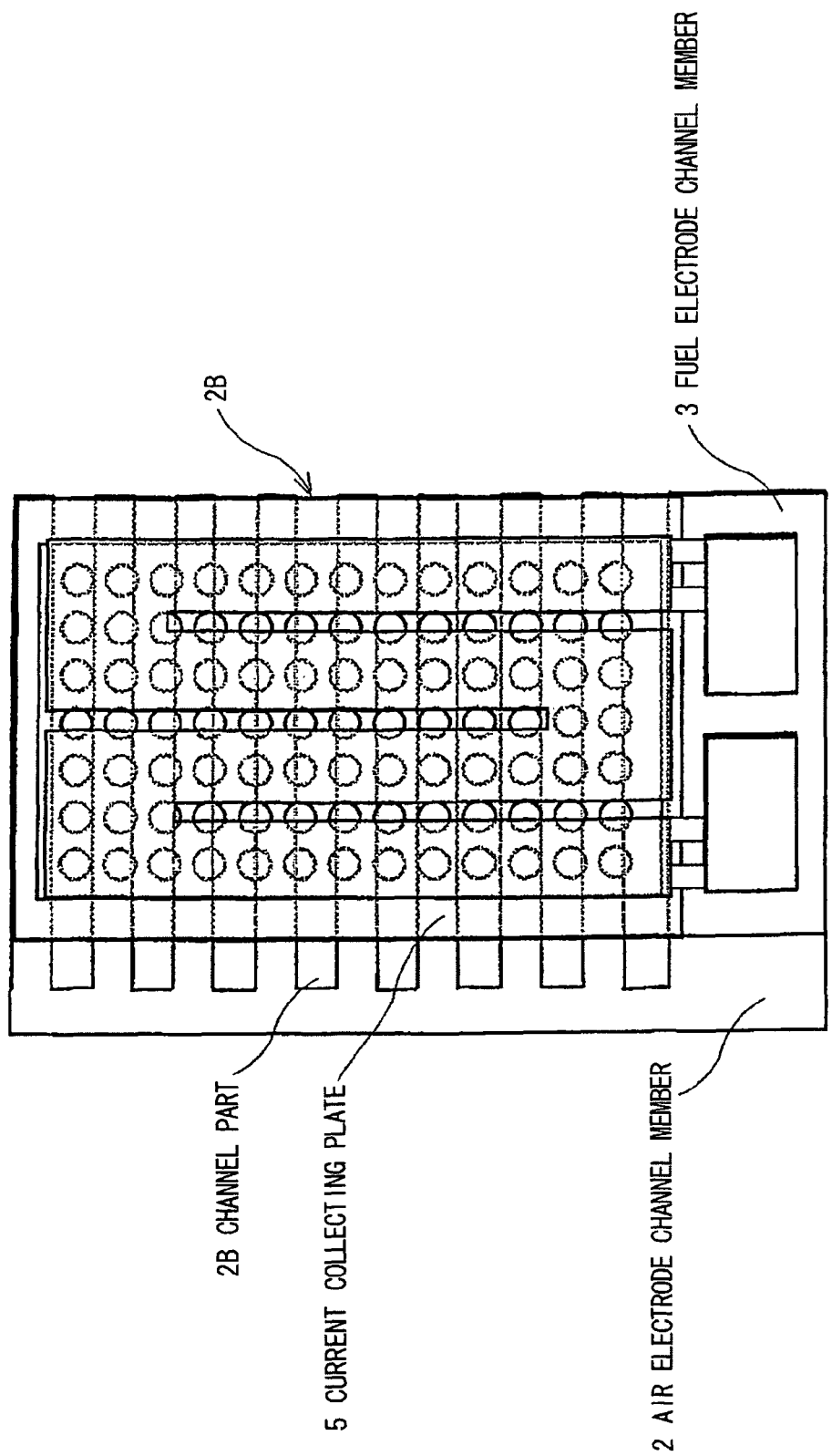
FIG. 6 is a schematic view showing a stack structure of cell members shown in FIGS. 4, 5A and 5B.

FIG. 6 is a schematic view showing a stack state of cell members shown in FIGS. 4, 5A and 5B. As shown in FIG. 6, in the stack state of the cell members, the channel part 2B of the air electrode channel member 2 is formed as exposed and opened outside of the fuel cell. This formation is capable of supplying air to all the channel members simultaneously.

Meanwhile it is preferable that the air electrode channel member 2 comprises a thickness of not less than 1.2 mm because the channels are so narrow (i.e., the thickness of the air electrode channel member 2 is so thin) that pressure loss would possibly increase and air would possibly not be supplied to all the channels. Also it is preferable that the air electrode channel comprises a cross sectional area per one channel part of not less than 1.2 mm$^2$. It is more preferable that the air electrode channel member 2 comprises a thickness of not less than 1.5 mm and the air electrode channel comprises a cross sectional area per one channel part of not less than 1.5 mm$^2$. To this fuel cell, a fan can be applied as an auxiliary machine for air supplying so that air supply with sufficient amount of air and low electric power consumption can be achieved. The upper limit of the thickness is not specified but it can be optionally determined according to setting space of the fuel cell system. When the thickness of the air electrode channel member 2 becomes below 1.2 mm and/or per one channel part of the air electrode channel becomes below 1.2 mm$^2$, stable electric generation in the fuel cell becomes impossible, by the fact that various causes complexly affect, such as blockage of the air electrode channel by production water produced by power generation, reduction of the cross sectional area in the air electrode channel part, and application of air fan with low electric power consumption (generally the air fan with low electric power consumption has low static pressure).

In addition a shape of the air electrode channel member 2 is not limited to be a comb-teeth shape and such a structure that air can be supplied to both surfaces of the air electrode channel member 2 may be used, e.g., such a structure that through-holes or slits are formed to the channel part 2B. For example when in FIG. 5A the right edge is connected in the long side direction as well as the left edge, it becomes a state comprising eight through-holes. Then it is required that the width of the air electrode channel member 2 is formed large, or opening parts communicating to the channel parts (through-holes) are formed in the left and right side surfaces of the air electrode channel member 2 shown in FIG. 5A, so as to assure a condition that both edges of the channel parts (through-holes) are exposed outside and air can enter and exit from left and right, even if the current collecting plates are stacked. Also, e.g., when only the central parts are connected in the long side direction (fishbone shape) instead of the connecting parts in the left and right edges, it is necessary that opening parts are formed in the central parts blocking the air channel, so as to assure a condition that air can pass through.

In a fuel electrode channel member 3, a manifold part (supply) $3A_1$ and a manifold part (discharge) $3A_2$ for passage of fuel are formed on edge part in short side of a rectangular plate, and a channel part 3B for passage of the fuel is formed all over the plate winding its way. The channel part 3B communicates with the manifold part $3A_1$ and the manifold part $3A_2$ through a communicating passage 3C. The channel part 3B can be made by such a method that grooves are formed on both surfaces of the plate, or through-hole is formed through the plate. When the fuel electrode channel member 3 comprises a rectangle shape, as shown in FIG. 5B, the channel part 3B is formed so as to wind its way in the short side direction (long linear part is disposed in parallel with the long side of the plate), but the channel part 3B may be formed so as to wind its way in the long side direction (long linear part is disposed in parallel with the short side of the plate).

Fuel supplied to the channel part 3B is supplied to the fuel electrode of the electric cell 1 disposed at both sides through through-holes 5C of the current collecting plate 5. The fuel is supplied sequentially from one of the manifold part $3A_1$ in the vertical direction relative to paper surface in FIG. 5B, and is discharged from the manifold part $3A_2$. Meanwhile the fuel can be supplied in the parallel direction relative to paper surface in FIG. 5B through opening grooves or opening hole formed on the side surface and communicating with the manifold part $3A_1$.

In the case that the fuel electrode channel member 3 is stacked to form a stack structure, when the fuel cell is assembled, a sealant is disposed around the periphery of the manifold parts $3A_1$, $3A_2$, the channel part 2B, and the communicating passage 3C, preventing the fuel from leaking outside.

There is no limitation as to a material used as the air electrode channel member 2 and the fuel electrode channel member 3 so long as it has heat resistance, corrosion resistance, and mechanical strength in an using environment of the fuel cell. That is, a plastic material, a ceramic material, and a metal material can be used. Also the shape thereof is not limited to be formed as a rectangle shape, and various shapes such as a square shape may be used, so long as they can avoid pressure loss in the air electrode channel.

Use Example in the Fuel Cell

Figure 7:
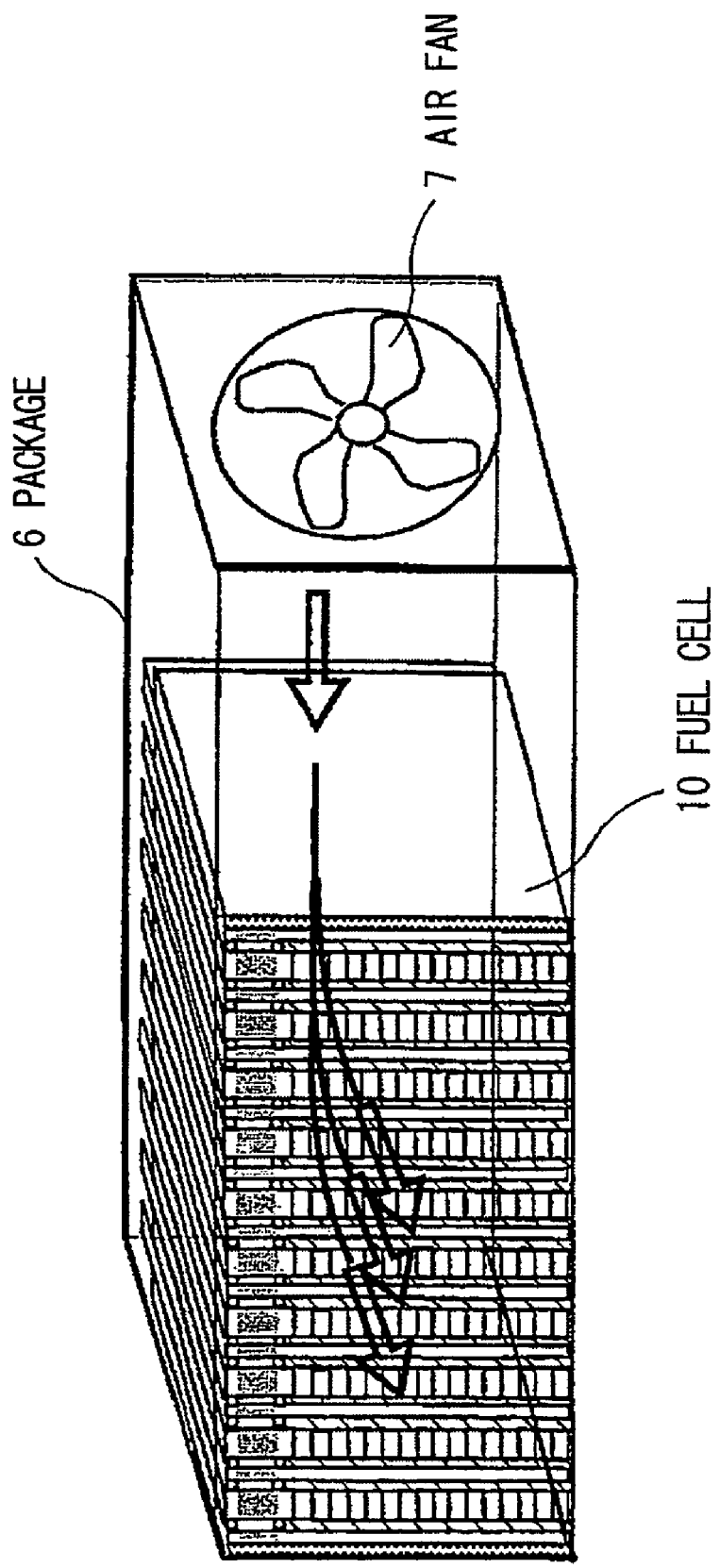
FIG. 7 is a perspective view schematically showing a use example in a preferred embodiment according to the invention.

FIG. 7 is a perspective view schematically showing a use example in a preferred embodiment according to the invention. As shown in FIG. 7, the fuel cell is placed in a package 6, and air is supplied to the fuel cell 10 by means of an air fan 7 mounted in the package 6. The air sent by the air fan 7 flows into inside of the fuel cell 10 from an exposed part of the channel part 2B formed in the air electrode channel member 2, and simultaneously is supplied to all the stacked channels so as to be discharged from an exposed part of an opposite surface of the fuel cell 10.

Figure 8:
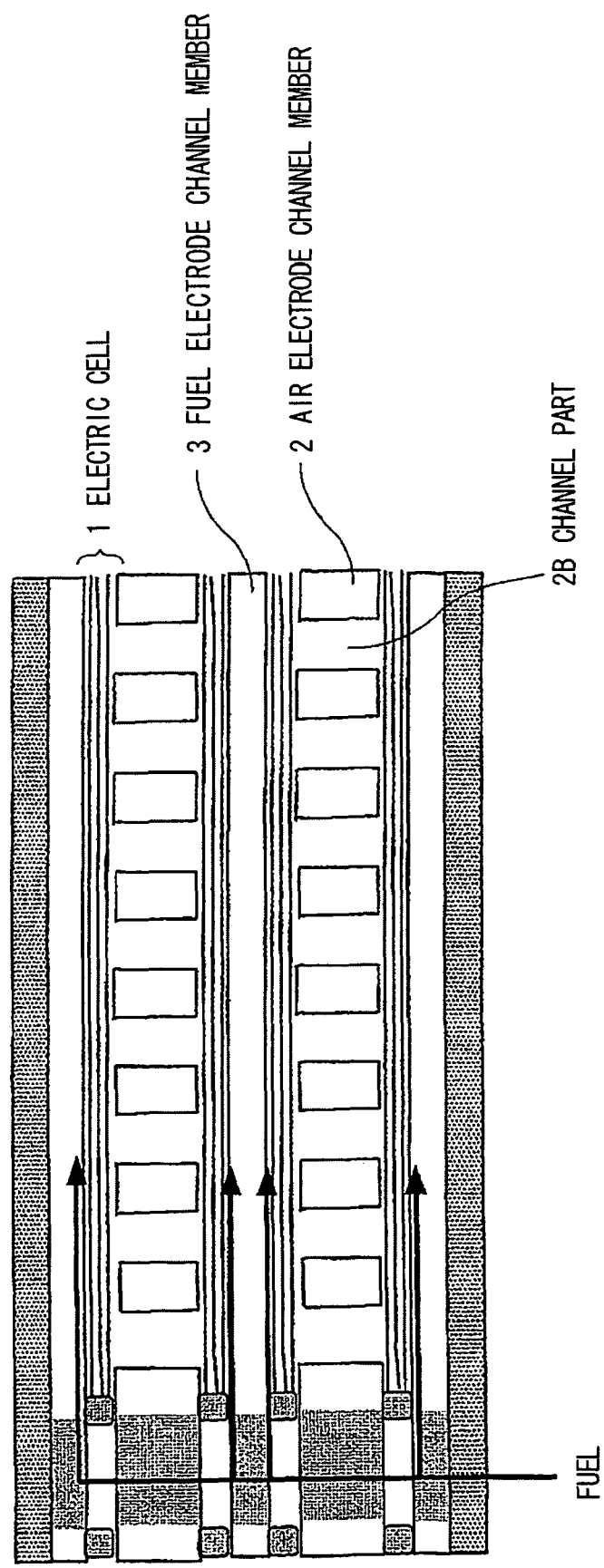
FIG. 8 is a cross sectional view schematically showing a one example of a direction of fuel movement in a preferred embodiment according to the invention.

FIG. 8 is a cross sectional view schematically showing a one example of a direction of fuel movement in a preferred embodiment according to the invention. Arrowed lines shown in FIG. 8 show the fuel movement direction. Fuel supplied to the channel part 3B of the fuel electrode channel member 3 is supplied to the fuel electrode of neighboring the electric cell 1. On the other hand, air moves in the channel part 2B of the air electrode channel member 2 in the vertical direction relative to paper surface in FIG. 8.

Advantages of the Embodiment

The following advantages can be obtained by the preferred embodiment as explained above.

(1) The air electrode channel member 2 comprises a thickness of as prescribed (i.e., not less than 1.2 mm) (preferably a thickness of not less than 1.2 mm and the air electrode channel comprising a cross sectional area per one channel part of not less than 1.2 mm². Thereby, pressure loss during the supply of air is reduced so that an auxiliary machine (such as a fan) with low electric power consumption can be used on the air supply side. Therefore, a DMFC power source with a low loss in the auxiliary machine and a high output can be obtained.

(2) An auxiliary machine with lower power consumption i.e., an auxiliary machine with smaller volume can be used. Therefore, the system volume can be reduced.

(3) By the combination of the above (1) and (2), the volume output density can be increased so that a high-performance cell for mobile devices can be obtained.

(4) The fuel electrodes are facing to each other and the air electrodes are facing to each other so that each supplying lines of the fuel to the fuel electrode and of the air to the air electrode can be shared. Therefore, the cell structure can be simplified and the manufacturing cost can be reduced.

EXAMPLE 1

Examples of the invention are designed for power sources of a notebook computer, while estimating an output of a power source system not less than about 12 W.

Manufacture of Fuel Cell

First, the current collecting plate 5 shown in FIGS. 4A and 4B was made as shown below. Conductive surface treatment (e.g., the surface treatment disclosed in JP-A-1998-228914) was conducted on a titanium plate of short side length 30 mm (left and right direction in FIGS. 4A and 4B), long side length 78 mm (top and bottom direction in FIGS. 4A and 4B), thickness 0.1 mm, and polyimide sheets (insulating sheets) 5B of thickness 0.035 mm were laminated on both surfaces of the titanium plate. Regarding one sheet of the laminated polyimide sheets 5B, part of the polyimide sheet 5B except for a margin (part of the polyimide sheet 5B responding to the collecting part 5A) was removed so as to be electrically conducted. Size of the catalyst part and the collecting part 5A was set to be 25 mm×75 mm. Also a great number of (7 pieces multiplied by 13 pieces in FIGS. 4A and 4B) through-holes were disposed evenly all over the collecting part 5A, passing through also another polyimide sheet 5B laminated on one surface (the opposite surface) of the collecting part 5A. Diameter of the through-holes was set to be 1.5 mm.

Between two of the current collecting plates 5 obtained, MEA 4 being a complex composed of a polymer electrolyte membrane (Nafion: registered trade mark), a catalyst part, and a gas diffusion (dispersion) layer was sandwiched by the collecting part 5A so as to form an electric cell 1 being a minimum unit of a fuel cell.

Next, an air electrode channel member 2 and a fuel electrode channel member 3 made of an acrylic polymer were prepared. Outer size of the air electrode channel member 2 was set to be 35 mm×85 mm×1.5 mm, width of the channel part 2B (top and bottom direction in FIG. 5A) was set to be 1 mm, depth of the channel part 2B (thickness of the air electrode channel member 2) was set to be 1.5 mm, pitch of the channel part 2B was set to be 2.5 mm, length of the channel part 2B (left and right direction in FIG. 5A) was set to be 32.5 mm, and the number of the channel parts 2B per one of the air electrode channel member 2 is set to be 30. Also outer size of the fuel electrode channel member 3 was set to be 30 mm×85 mm×0.5 mm, width of the channel part 3B was set to be 5 mm, depth of the channel part 3B (thickness of the fuel electrode channel member 3) was set to be 0.5 mm, length of the channel part 3B was set to be 285 mm, and the number of the channel parts 3B per one of the fuel electrode channel member 3 is set to be 1.

The electric cells 1 obtained were disposed on both sides of the air electrode channel member 2, in such a way that the air electrode sides thereof faced each other. And also the fuel electrode channel member 3 was disposed at the outside of the intermediate structure obtained above. Further the fuel electrode side of the electric cell 1 was disposed at the outside of the intermediate structure and the air electrode channel member 2 was disposed at the outside of the intermediate structure. As mentioned above, twenty electric cells 1 were stacked, in such a way that the air electrodes and the fuel electrodes were disposed alternately and in order, and also the same kind of the electrodes thereof faced each other, so that the fuel cell 10 comprising twenty stacked electric cells 1 was fabricated as shown in FIG. 1. In addition, a sealant was interposed between the fuel electrode channel member 3 and the fuel electrode of the electric cell 1, and between the fuel electrode channel member 3 and the air electrode channel member 2. In this fuel cell, a distance between the air electrodes (thickness of the air electrode channel member 2) became 1.5 mm, a distance between the fuel electrodes (thickness of the fuel electrode channel member 3) became 0.5 mm and thickness of the fuel cell composed of twenty stacked cells became about 47 mm.

The fuel cell 10 obtained was covered with a package 6 as shown in FIG. 7, and an air fan 7 (manufactured by Sanyo Denki Co., Ltd., model number: 109BC12HA7) was mounted on the edge part of the package 6.

Evaluation of Fuel Cell

Methanol (3 mass %) fuel was supplied to the fuel cell 10 obtained by a pump (manufactured by Enomoto Micro Pump Mfg. Co., Ltd., model number: CM-15W-12) and the air was supplied by the fan 7 (air volume: about 0.07 m³/min, air temperature representative in the fuel cell: about 50 degrees C.) so as to conduct a power generation test. As the result, output of the fuel cell was measured as 18.8 W, power consumption of the fuel pump was measured as 1 W, and power consumption of the air fan was measured as 2 W so that output of the cell system was calculated as 15.8 W. In addition, output density per volume was calculated as about 52 W/L because volume of the cell system was about 304 cm³.

EXAMPLE 2

Manufacture of Fuel Cell

Figure 9:
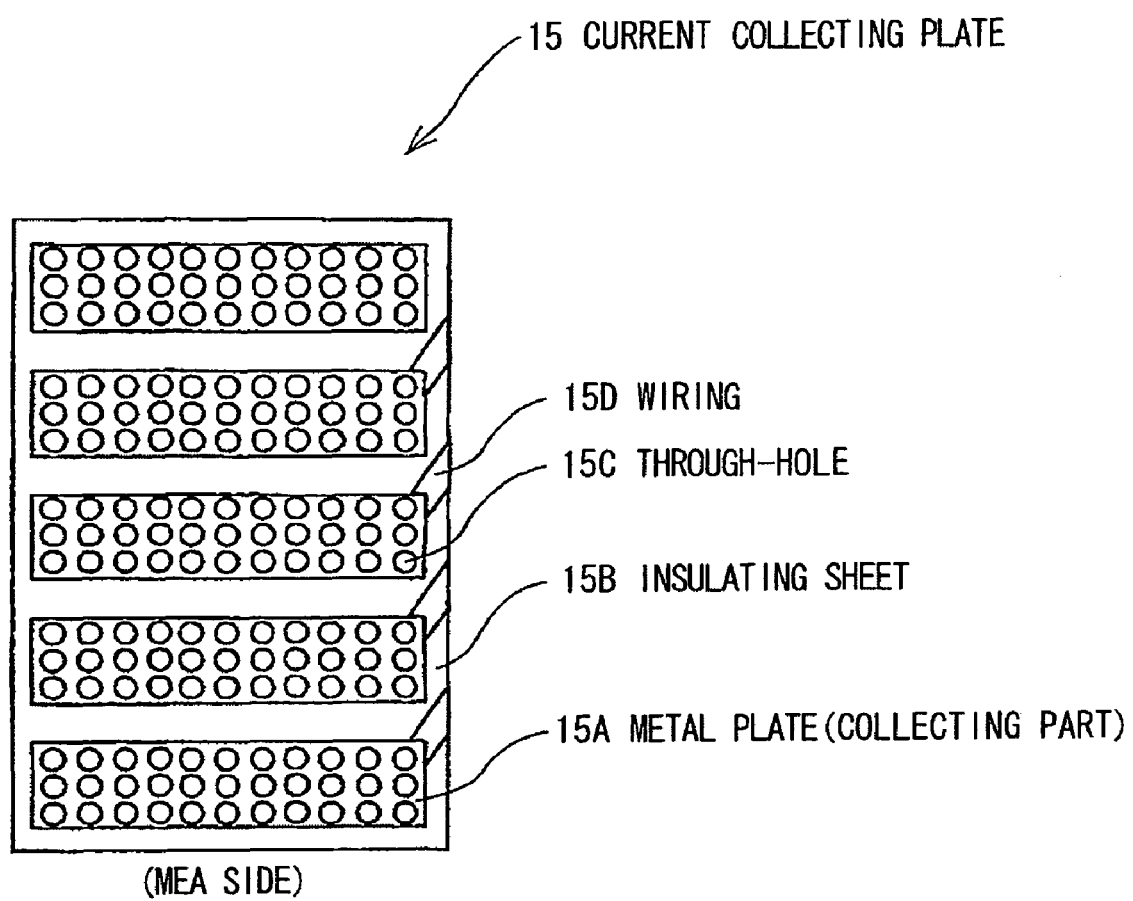
FIG. 9 is a schematic view showing a structure of a current collecting plate used in a fuel cell in Example 2 of the invention.

FIG. 9 is a schematic view showing a structure of a current collecting plate used in a fuel cell in Example 2. FIGS. 10A to 10C are process drawings schematically and partially showing a method of making a fuel cell in Example 2.

As shown in FIG. 9 and FIGS. 10A to 10C, in this Example, five metal plate (the collecting part) 15A were disposed longwise so as to form one block of the current collecting plates and four blocks of the current collecting plates 15a to 15d were disposed neighboring each other so that ten electric cells 1 were formed from the current collecting plates 15a and 15b, and the current collecting plates 15c and 15d, and also a current collecting plate (complex of the current collecting plate) 15 was fabricated, while colleting wirings 15D were formed on the complex of the current collecting plate 15. By the colleting wirings 15D, ten electric cells 1 were connected in series.

First, conductive surface treatment (e.g., the surface treatment disclosed in JP-A-1998-228914) was conducted on a titanium plate as shown in FIGS. 10A to 10C, of long side length 450 mm (left and right direction in FIGS. 10A to 10C), short side length 160 mm (top and bottom direction in FIGS. 10A to 10C), thickness 0.1 mm, and polyimide sheets (insulating sheets) 5B of thickness 0.035 mm were laminated on both surfaces of the titanium plate. Regarding one sheet of the laminated polyimide sheets 5B, part of the polyimide sheet 5B except for a margin (part of the polyimide sheet 5B responding to the collecting part 15A) was removed so as to be electrically conducted and to form the collecting part 15A. Size of the collecting parts 15A was set to be 20 mm×90 mm.

Also a great number of (5 sets in the top and bottom direction and 1 block in the left and right direction, composed of 3 pieces multiplied by 11 pieces in FIG. 9) through-holes were disposed on the collecting part, passing through also another polyimide sheet 5B laminated on one surface (the opposite surface) of the collecting part. Diameter of the through-holes was set to be 1.5 mm. In addition, through-holes 15E comprising a rectangle shape were disposed, while edge parts were left in order to be folded easily at borderline between the collecting part 15b and the collecting part 15c (see FIGS. 10A to 10C). Size of the through-holes 15E was set to be 5 mm×150 mm.

MEA 14 being a complex composed of a polymer electrolyte membrane (Nafion: registered trademark), a catalyst part (each size of the catalyst part is set to be 20 mm×90 mm), and a gas diffusion (dispersion) layer was disposed on the current collecting plates 15b, 15c constituting the collecting parts 15 obtained and the current collecting plates 15a, 15d were folded to the front side of paper so as to sandwich the MEA 14. Then a current collecting plate module 18 is obtained as shown in FIG. 10B.

Subsequently, as shown in FIG. 10C, the air electrode channel member 2 was sandwiched between the folded current collecting plate module 18, in such a way that the air electrode sides of the module 18 faced each other. And also the fuel electrode channel member 3 was disposed at the outside of the intermediate structure obtained above. Further the air electrode channel member 2 was disposed at the outside of the intermediate structure. As mentioned above, four current collecting plate modules were stacked, in such a way that the air electrodes and the fuel electrodes were disposed alternately and in order, and also the same kind of the electrodes thereof faced each other, so that the fuel cell comprising twenty cells as a whole was fabricated.

Outer size of the air electrode channel member 2 was set to be 120 mm×175 mm×2 mm, width of the channel part 2B (top and bottom direction in FIG. 10C) was set to be 2 mm, depth of the channel part 2B (thickness of the air electrode channel member 2) was set to be 2 mm, pitch of the channel part 2B was set to be 4.8 mm, length of the channel part 2B (left and right direction in FIG. 10C) was set to be 115 mm, and the number of the channel parts 2B per one of the air electrode channel member 2 is set to be 25. Also outer size of the fuel electrode channel member 3 was set to be 110 mm×175 mm×0.5 mm, width of the channel part 3B was set to be 21 mm, depth of the channel part 3B (thickness of the fuel electrode channel member 3) was set to be 0.5 mm, length of the channel part 3B was set to be 560 mm, and the number of the channel parts 3B per one of the fuel electrode channel member 3 is set to be 1. In addition, a sealant was interposed between the fuel electrode channel member 3 and the fuel electrode of the electric cell 1, and between the fuel electrode channel member 3 and the air electrode channel member 2.

In this fuel cell, a distance between the air electrodes (thickness of the air electrode channel member 2) became 2 mm, a distance between the fuel electrodes (thickness of the fuel electrode channel member 2) became 0.5 mm, and thickness of the fuel cell composed of twenty stacked cells became about 13.5 mm.

The fuel cell 10 obtained was covered with a package 6 similar to the one used in Example 1, and an air fan 7 (manu-factured by Sanyo Denki Co., Ltd., model number: 109BC12HA7) was mounted on the edge part of the package 6.

Evaluation of Fuel Cell

Methanol (3 mass %) fuel was supplied to the fuel cell obtained by a pump (manufactured by Enomoto Micro Pump Mfg. Co., Ltd., model number: CM-15W-12) and the air was supplied by the fan 7 (air volume: about 0.07 $m^3$/min, air temperature representative in the fuel cell: about 50 degrees C.) so as to conduct a power generation test. As the result, output of the fuel cell was measured as 18 W, power consumption of the fuel pump was measured as 1 W, and power consumption of the air fan was measured as 2 W so that output of the cell system was calculated as 15 W. In addition, output density per volume was calculated as about 33 W/L because volume of the cell system was about 455 $cm^3$.

It was confirmed that such a different formation from Example 1 as a formation of Example 2 responding to a difference of disposition place could be also used because in Example 2 a panel structure was applied (plural electric cells were disposed in plane-direction) different from Example 1.

EXAMPLE 3

Manufacture of Fuel Cell Components

Figure 11:
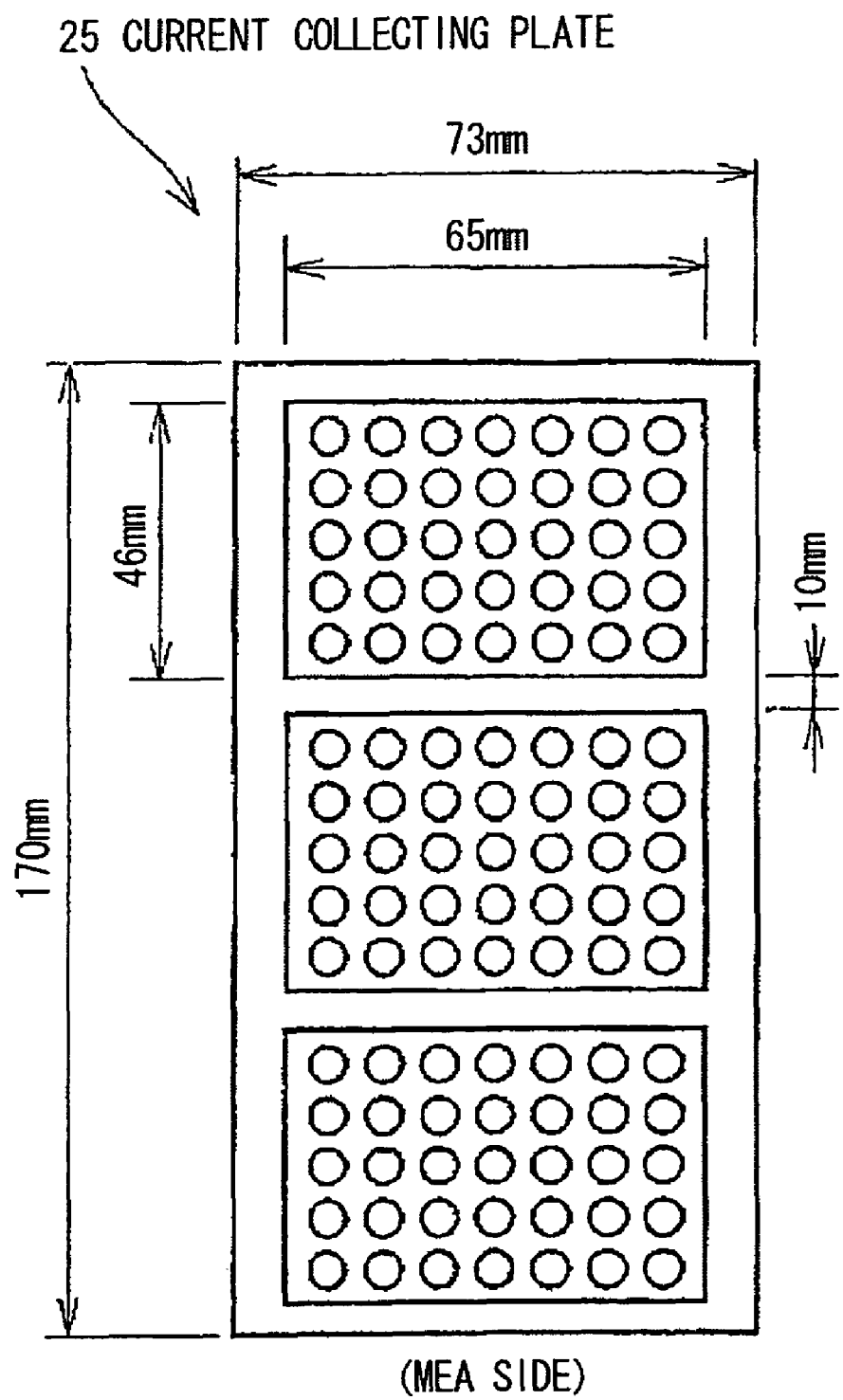
FIG. 11 is a schematic view showing a structure of a current collecting plate used in a fuel cell in Example 3 of the invention.

FIG. 11 is a schematic view showing a structure of a current collecting plate used in a fuel cell shown in Example 3. A current collecting plate was made in the same manner as Example 1, while a titanium plate of 73 mm×170 mm (thickness of 0.1 mm) was used. Three collecting parts of 65 mm×46 mm were disposed at 10 mm intervals.

Figure 12A:
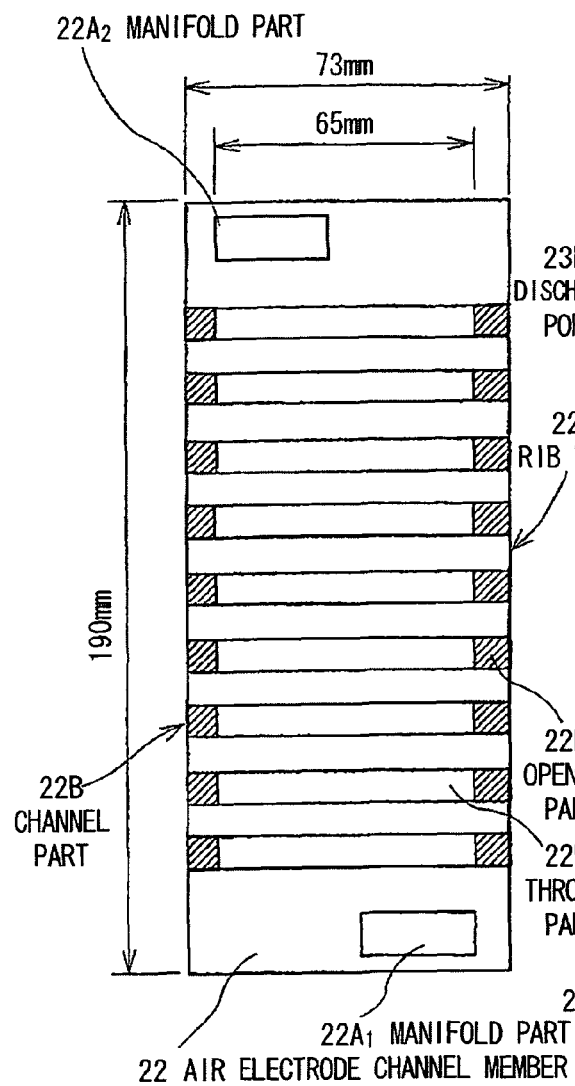
FIG. 12A is a schematic view showing a structure of an air electrode channel member used in a fuel cell in Example 3 of the invention.
Figure 12B:
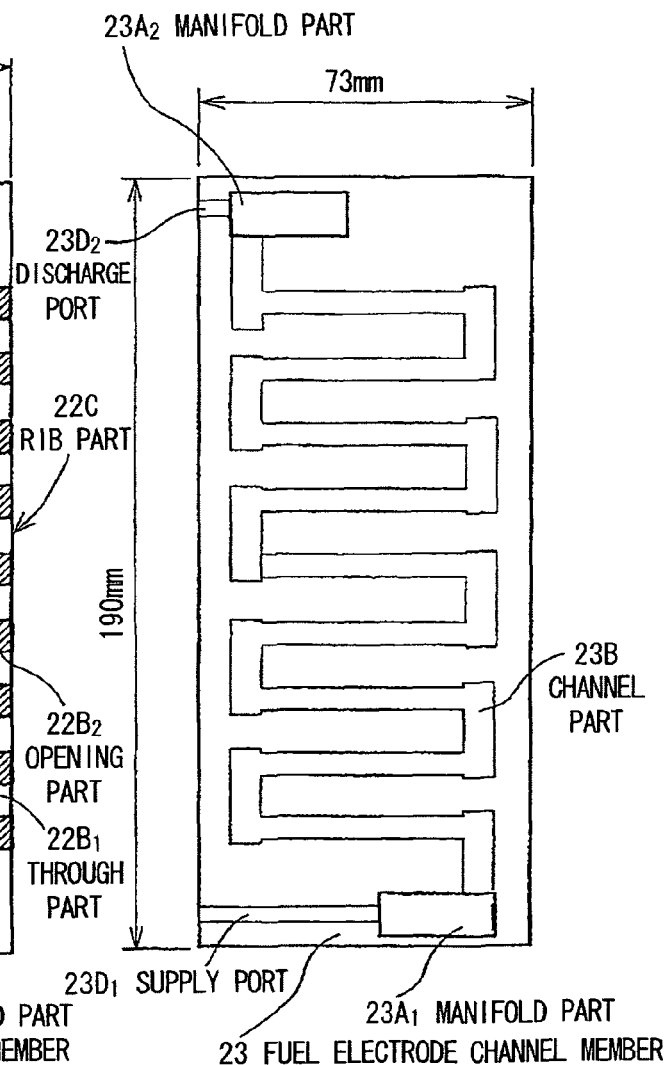
FIG. 12B is a schematic view showing a structure of a fuel electrode channel member used in a fuel cell in Example 3 of the invention.

FIG. 12A is a schematic view showing a structure of an air electrode channel member used in a fuel cell shown in Example 3. FIG. 12B is a schematic view showing a structure of a fuel electrode channel member used in a fuel cell shown in Example 3. FIG. 13A is a schematic view showing a stack state of a current collecting plate shown in FIG. 11 and an air electrode channel member shown in FIG. 12A. Also FIG. 13B is a schematic view showing a stack state of a current collecting plate shown in FIG. 11 and a fuel electrode channel member shown in FIG. 12B.

An air electrode channel member 22 was formed as mentioned below. A polyphenyl sulfate (PPS) plate of 73 mm×190 mm×1.5 mm was prepared. A manifold part (supply) $22A_1$ and a manifold part (discharge) $22A_2$ for passage of the air were formed on the edge part in short side of the rectangular plate. Also channel parts 22B (width of the channel parts 22B was set to be 2 mm in the top and bottom direction in FIG. 12A) and rib parts 22C (width of the rib parts 22C was set to be 2.6 mm in the top and bottom direction in FIG. 12A) were alternately formed in parallel with the short side of the plate by cutting work. The channel parts 22B comprise through parts $22B_1$ and opening parts $22B_2$ (groove depth of the opening parts $22B_2$ was set to be 1 mm in the depth direction relative to paper surface in FIG. 12A) communicating with the through parts $22B_1$. The through parts $22B_1$ were formed in a rectangular shape having long side length of 65 mm (groove depth of the through parts $22B_1$ (thickness of the air electrode channel member 22 and in the depth direction relative to paper surface in FIG. 12A) was set to be 1.5 mm).

A fuel electrode channel member 23 was formed as mentioned below. A polyphenyl sulfate (PPS) plate of 73 mm×190 mm×1.5 mm was prepared in the same manner as the above. A manifold part (supply) $23A_1$ and a manifold part (discharge) $23A_2$ for passage of the fuel were formed on the edge part in short side of the rectangular plate. Also a channel part 23B winding its way in the long side direction (long linear part is disposed in parallel with the short side of the plate), and a fuel supply port $23D_1$ and a fuel discharge port $23D_2$ communicating with manifold parts $23A_1$, $23A_2$ by cutting work. The channel part 23B was not formed as a through hole, but was formed as grooves (each groove width of 6 mm, each groove depth of 0.5 mm, each groove length of 500 mm) on both surfaces.

As shown in FIGS. 13A and 13B, the current collecting plate 25, the air electrode channel member 22 and the fuel electrode channel member 23 were disposed each other and designed so that the through-holes of the current collecting plate 25, the channel part 22B of the air electrode channel member 22, and the channel part 23B of the fuel electrode channel member 23 could overlap each other in large area as much as possible.

Method of Making Air Electrode Channel Member

Figure 14:
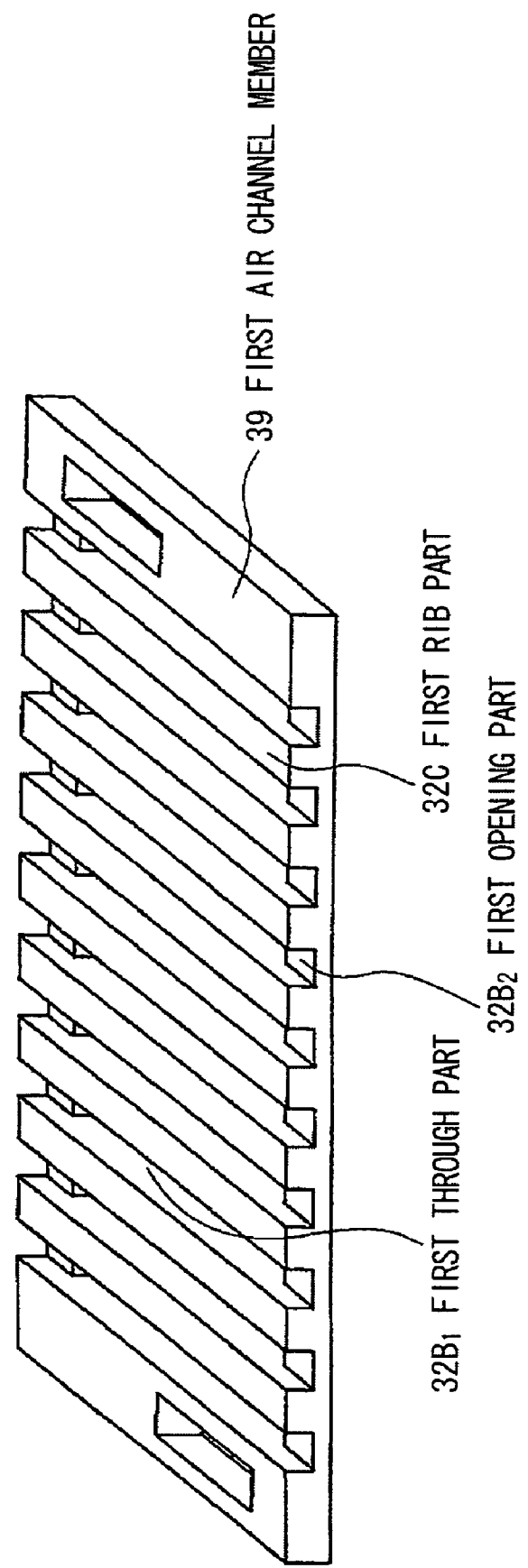
FIG. 14 is a perspective view schematically showing a component of an air electrode channel member.
Figure 15:
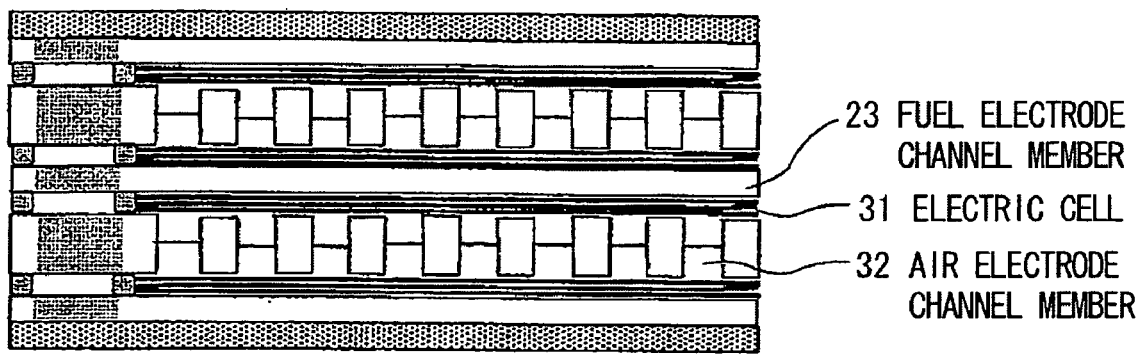
FIG. 15 is a partially cross sectional view schematically showing a fuel cell made by use of a component of an air electrode channel member shown in FIG. 14.
Figure 16:
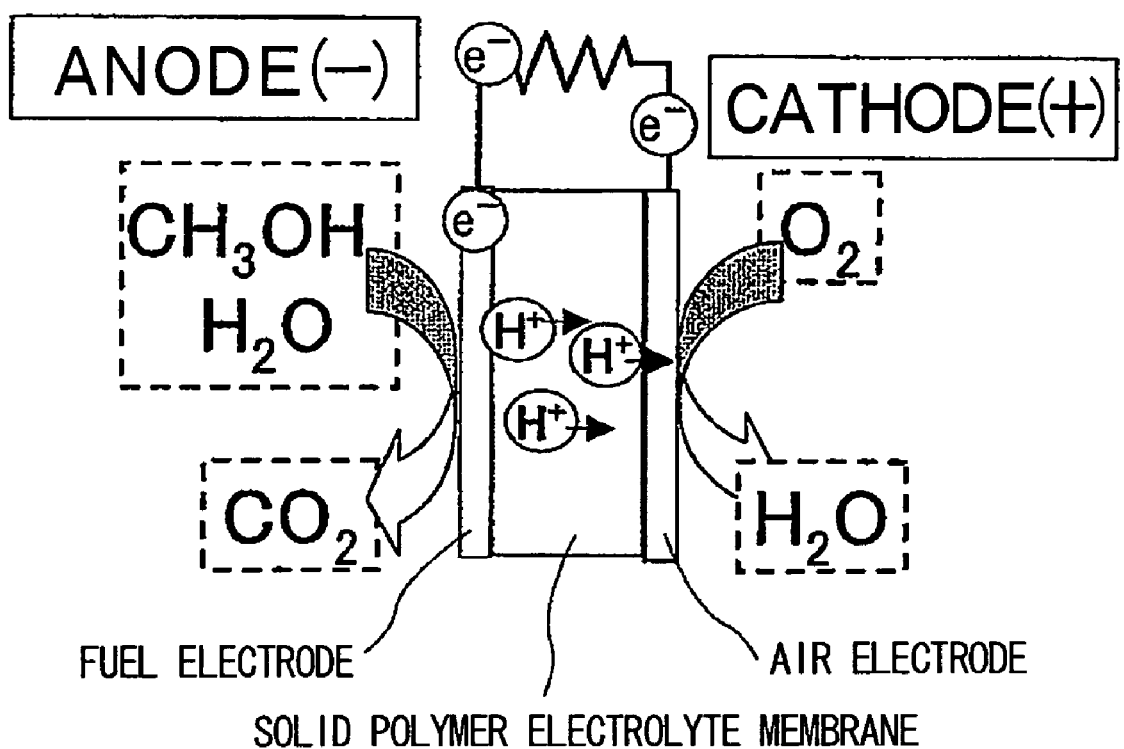
FIG. 16 is a schematic view showing a principle of electric generation in a direct methanol type fuel cell (DMFC)
Figure 17:
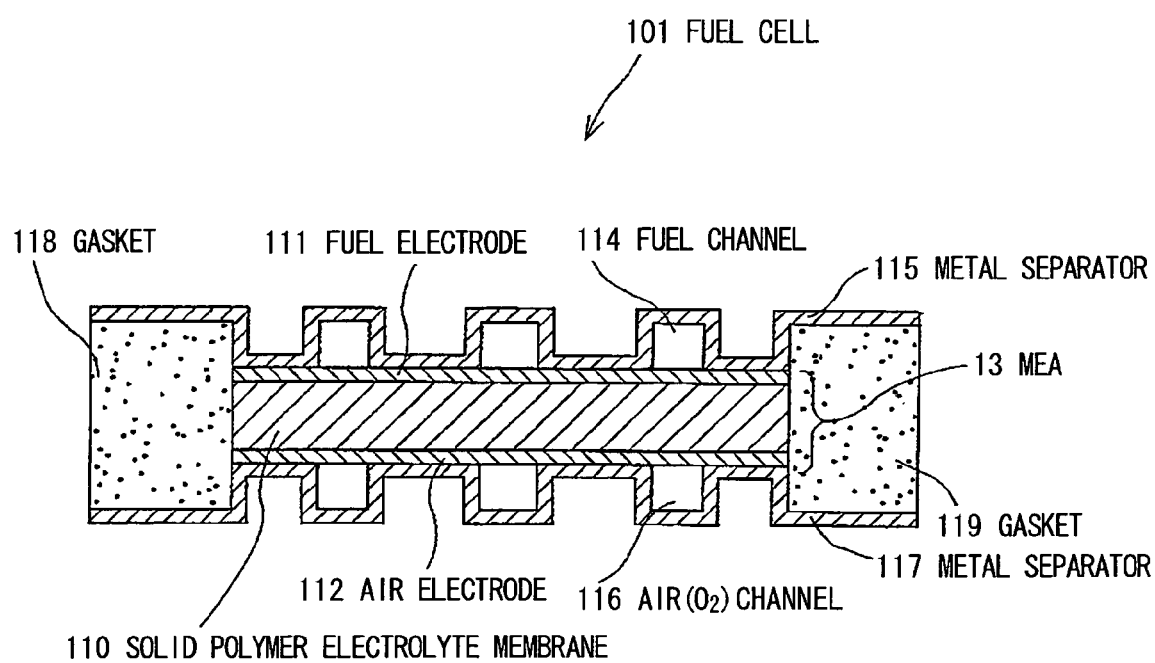
FIG. 17 is a schematic view showing the structure of a conventional fuel cell (DMFC)
Figure 18:
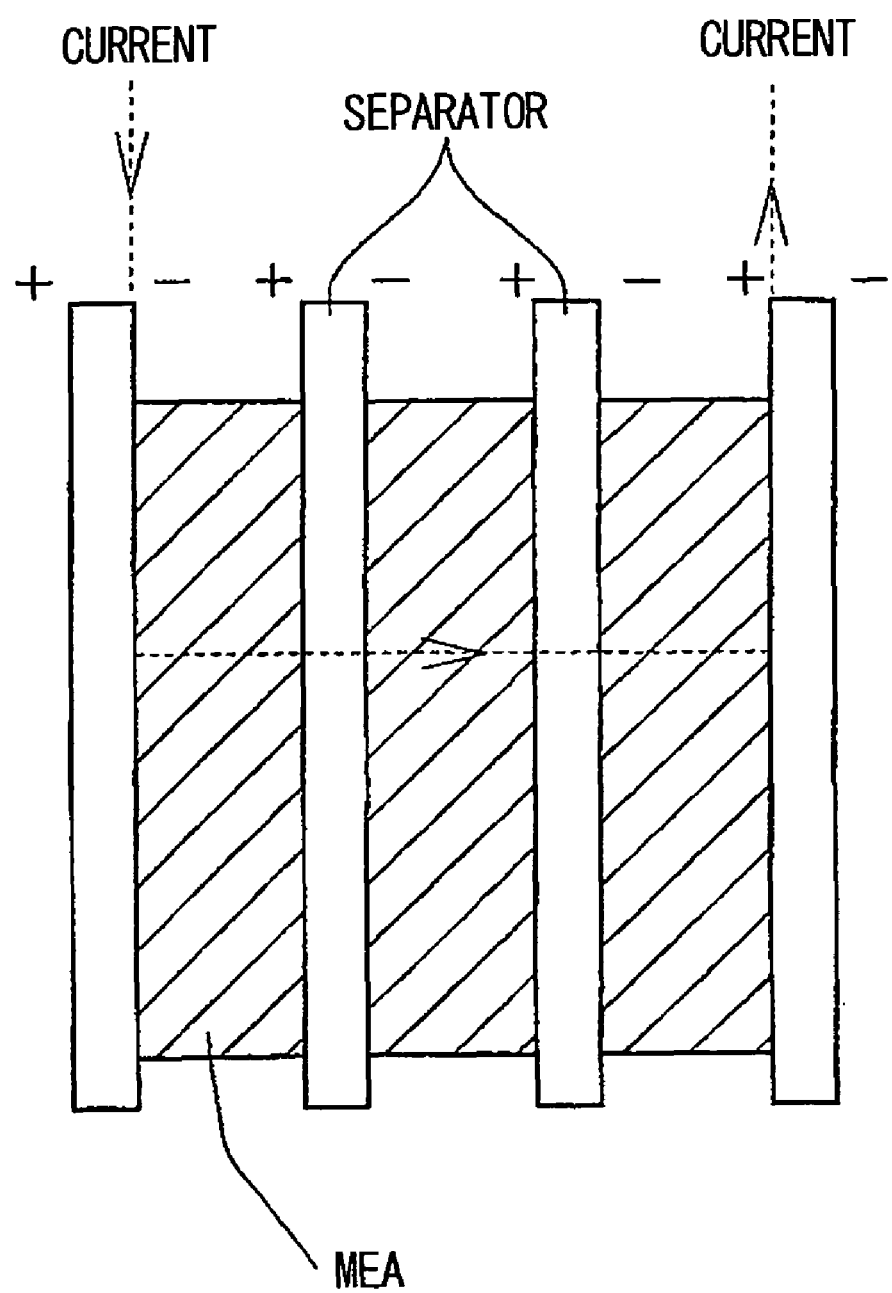
FIG. 18 is a cross sectional view schematically showing a stack structure in the conventional fuel cell.

FIG. 14 is a perspective view schematically showing a component of an air electrode channel member. FIG. 15 is a partially cross sectional view schematically showing a fuel cell made by use of a component of an air electrode channel member shown in FIG. 14. When the air electrode channel member is formed in the shape of Example 3, instead of forming it by cutting a piece of plate for it, the following method was applied. That is, a first air channel member 39 and a second air channel member (not shown) were prepared and stacked in a condition that each rib part faced each other so that the air electrode channel member was formed (FIG. 14 shows different channel member and rib part from the ones shown in FIG. 12 in number (disposition)) A through part and an opening part constituting the channel part were formed of a first through part $32B_1$ and a second through part $32B_1$ (not shown), and a first opening part $32B_2$ and a second opening part $32B_2$ (not shown). Also the rib parts between the channel parts were formed of a first rib part 32C and a second rib part (not shown).

Manufacture of Fuel Cell

Between two of the current collecting plates 25 obtained, MEA 4 being a complex composed of a polymer electrolyte membrane (Nafion: registered trade mark), a catalyst part (each size of the catalyst part is set to be 65 mm×46 mm), and a gas diffusion (dispersion) layer was sandwiched so that an current collecting plate module was formed.

The current collecting plate module obtained were disposed on both sides of the above mentioned air electrode channel member 32 which was formed by that the first air channel member 39 and the second air channel member (not shown) were stacked, in such a way that the air electrode sides thereof faced each other. And also the fuel electrode channel member 23 was disposed at the outside of the intermediate structure obtained above. Further the fuel electrode side of the current collecting plate module was disposed at the outside of the intermediate structure and the air electrode channel member 32 was disposed at the outside of the intermediate structure. As mentioned above, four current collecting plate modules were stacked, in such a way that the air electrodes and the fuel electrodes were disposed alternately and in order, and also the same kind of electrodes thereof faced each other, so that the fuel cell comprising twelve stacked cells as a whole was fabricated as shown in FIG. 15. In addition, a sealant was interposed between the fuel electrode channel member 23 and the current collecting plate module, and between the fuel electrode channel member 23 and the air electrode channel member 32. In this fuel cell, a distance between the air electrodes (thickness of the air electrode channel member 32) became 3 mm, a distance between the fuel electrodes (thickness of the fuel electrode channel member 23) became 1.5 mm and thickness of the fuel cell composed of series-connected twenty cells became about 17.5 mm.

The whole of the fuel cell obtained was covered with a package 6 similar to the one used in Example 1, and an air fan 7 (manufactured by Sanyo Denki Co., Ltd., model number: 109BC12HA7) was mounted on the edge part of the package 6.

Evaluation of Fuel Cell

Methanol (3 mass %) fuel was supplied to the fuel cell obtained by a pump (manufactured by Enomoto Micro Pump Mfg. Co., Ltd., model number: CM-15W-12) and the air was supplied by the fan 7 (air volume: about 0.07 m³/min, air temperature representative in the fuel cell: about 50 degrees C.) so as to conduct a power generation test. As the result, output of the fuel cell was measured as 18.5 W, power consumption of the fuel pump was measured as 1 W, and power consumption of the air fan was measured as 2 W so that output of the cell system was calculated as 15.5 W. In addition, output density per volume was calculated as about 39 W/L because volume of the cell system was about 400 cm³.

EXAMPLE 4

Manufacture of Channel Member

Figure 19:
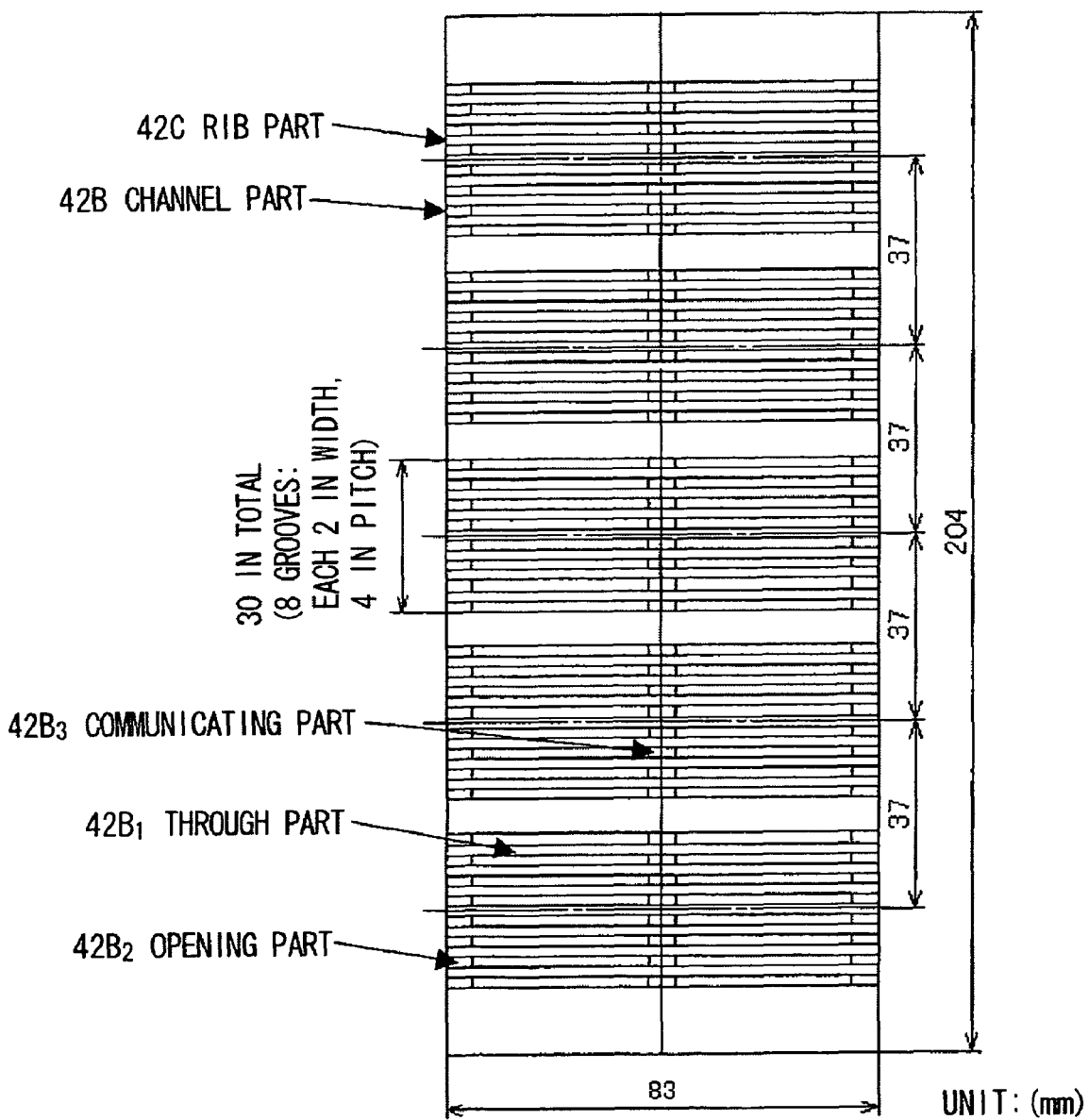
FIG. 19 is a schematic view showing a structure of a first fuel electrode channel member used in a fuel cell in Example 4 of the invention.

FIG. 19 is a schematic view showing a structure of a first fuel electrode channel member used in a fuel cell shown in Example 4. A first air electrode channel member 42 was formed as mentioned below. A polyphenyl sulfate (PPS) plate of 83 mm×204 mm×1.5 mm was prepared. A supply manifold part (not shown) and a discharge manifold part (not shown) for passage of the air were formed on the edge part in short side of the rectangular plate by cutting work in the same manner as Example 3. Also as shown in FIG. 19, channel parts 42B (width of the channel parts 42B was set to be 2 mm in the top and bottom direction in FIG. 19, and length was set to be 83 mm in the left and right direction) and rib parts 42C (width of the rib parts 42C was set to be 2 mm in the top and bottom direction in FIG. 19) were alternately formed in parallel with the short side of the plate so that five sets (one set was composed of eight channel parts 42B and seven rib parts 42C, and total length of 30 mm) were fabricated (pitch between sets was set 37 mm). The channel parts 42B comprise through parts $42B_1$, opening parts $42B_2$ (groove depth of the opening parts $42B_2$ was set to be 1 mm in the depth direction relative to paper surface in FIG. 19) communicating with the through parts $42B_1$, and communicating parts $42B_3$ (groove depth of the communicating parts $42B_3$ was set to be 1 mm in the depth direction relative to paper surface in FIG. 19). The through parts $42B_1$ were formed in a rectangular shape having long side length of 65 mm (groove depth of the through parts $42B_1$ (thickness of the air electrode channel member 42 and in the depth direction relative to paper surface in FIG. 19) was set to be 1.5 mm).

An air electrode channel member 52 used in Example 4, in the same manner as Example 3, was formed as mentioned below. That is, the above mentioned first air electrode channel member 42 and a second air electrode channel member (not shown) were formed respectively and stacked in such a way that each rib part faced each other so that the air electrode channel member 52 was fabricated.

An fuel electrode channel member was formed by use of PPS plate of 83 mm×204 mm×1.5 mm in the similar shape as Example 3. The channel part was not formed as a through hole, but was formed as grooves (each groove width of 8 mm, each groove depth of 0.5 mm, each groove length of 500 mm) on both surfaces.

Manufacture of Fuel Cell

FIGS. 20A to 20C are process drawings schematically and partially showing a method of making a fuel cell in Example 4.

As shown in FIGS. 20A to 20C, in this Example, five current collecting plates were disposed longwise so as to form one block of the current collecting plate and four blocks of the current collecting plates 25a to 25d were disposed neighboring each other so that ten electric cells were formed from the current collecting plates 25a and 25b, and the current collecting plates 25c and 25d, and also a current collecting plate (complex of the current collecting plate) 25 was fabricated, while colleting wirings 25D were formed on the complex 25 of the current collecting plate. By the colleting wirings 25D, ten electric cells were connected in series.

First, conductive surface treatment (e.g., the surface treatment disclosed in JP-A-1998-228914) was conducted on a titanium plate as shown in FIG. 20A, short side length 166 mm (left and right direction in FIGS. 20A to 20C), of long side length 184 mm (top and bottom direction in FIGS. 20A to 20C), thickness 0.1 mm, and polyimide sheets (insulating sheets) 5B of thickness 0.035 mm were laminated on both surfaces of the titanium plate. Regarding one sheet of the laminated polyimide sheets 5B, part of the polyimide sheet 5B except for a margin was removed so as to be electrically conducted and to form the collecting part 25A. Size of the collecting parts 25A was set to be 30 mm×30 mm.

Also a great number of (5 sets in the top and bottom direction and 4 block in the left and right direction, composed of 5 pieces multiplied by 8 pieces in FIGS. 20A to 20C) through-holes were disposed on the collecting part, passing through also another polyimide sheet 5B laminated on one surface (the opposite surface) of the collecting part. Each through-hole was set to be 2 mm×4 mm.

MEA 24 being a complex composed of a polymer electrolyte membrane (Nafion: registered trademark), a catalyst part (each size of the catalyst part is set to be 30 mm×30 mm), and a gas diffusion (dispersion) layer was disposed on the current collecting plates 25b, 25c constituting the current collecting plate 25 obtained and the current collecting plates 25a, 25d were folded to the front side of paper so as to sandwich the MEA 24. Then a current collecting plate module 28 is obtained as shown in FIG. 20B.

Subsequently, the air electrode channel member 52 was sandwiched between two current collecting plate modules 28, in such a way that the air electrode sides of the module 28 faced each other and both sides were aligned (FIG. 20C schematically shows a state of sandwiching). And also a fuel electrode channel member 43 (not shown) was disposed at the outside of the intermediate structure obtained above in the same manner as Example 3. Further the fuel electrode side of the current collecting plate module 28 was disposed at the outside of the intermediate structure obtained above. Furthermore the air electrode channel member 52 was disposed at the outside of the intermediate structure. As mentioned above, four current collecting plate modules were stacked, in such a way that the air electrodes and the fuel electrodes were disposed alternately and in order, and also the same kind of the electrodes thereof faced each other, so that the fuel cell comprising forty cells as a whole was fabricated.

In addition, a sealant was interposed between the fuel electrode channel member 43 and the fuel electrode of the current collecting plate module 28, and between the fuel electrode channel member 43 and the air electrode channel member 52.

In this fuel cell, a distance between the air electrodes (thickness of the air electrode channel member 52) became 3 mm, a distance between the fuel electrodes (thickness of the fuel electrode channel member 43) became 1.5 mm, and thickness of the fuel cell composed of (series-connected) forty stacked cells became about 22 mm.

The whole of the fuel cell was covered with a package 6 similar to the one used in Example 1, and an air fan 7 (manufactured by Sanyo Denki Co., Ltd., model number: 109BC12HA7) was mounted on the edge part of the package 6.

Evaluation of Fuel Cell

Methanol (3 mass %) fuel was supplied to the fuel cell obtained by a pump (manufactured by Enomoto Micro Pump Mfg. Co., Ltd., model number: CM-15W-12) and the air was supplied by the fan 7 (air volume: about 0.07 $m^3$/min, air temperature representative in the fuel cell: about 50 degrees C.) so as to conduct a power generation test. As the result, output of the fuel cell was measured as 21.5 W, power consumption of the fuel pump was measured as 1 W, and power consumption of the air fan was measured as 2 W so that output of the cell system was calculated as 18.5 W. In addition, output density per volume was calculated as about 36 W/L because volume of the cell system was about 520 $cm^3$.

COMPARATIVE EXAMPLE 1 AND COMPARATIVE EXAMPLE 2

Manufacture of Fuel Cell

As the current collecting plate 5 the same one as used in Example 1 was fabricated. Between two of the current collecting plates 5 obtained, MEA 4 being a complex composed of a polymer electrolyte membrane (Nafion: registered trade mark), a catalyst part, and a gas diffusion (dispersion) layer was sandwiched by the collecting part 5A so as to form an electric cell 1 being a minimum unit of a fuel cell.

Next, an air electrode channel member 2' (Comparative Example 1), 2" (Comparative Example 2) and a fuel electrode channel member 3 were made from an acrylic polymer. Depth of the channel part 2B (thickness of the air electrode channel members 2', 2") was set to be 0.5 mm (Comparative Example 1) and 1 mm (Comparative Example 2). As the other specifications (width of the channel part 2B (top and bottom direction in FIG. 5A), length of the channel part 2B (left and right direction in FIG. 5A), pitch of the channel part 2B, and the number of the channel parts 2B per one of the air electrode channel members 2', 2"), the same ones as used in Example 1 were applied. Also as the fuel electrode channel member 3 the same one as used in Example 1 was prepared.

By use of obtained the electric cells 1, the air electrode channel member 2' (Comparative Example 1) and the fuel electrode channel member 3, and according to the same procedure as used in Example 1, the fuel cell 10A (Comparative Example 1) comprising twenty stacked electric cells 1 was fabricated as shown in FIG. 1. Also by use of obtained the electric cells 1, the air electrode channel member 2" (Comparative Example 2) and the fuel electrode channel member 3, and according to the same procedure as used in Example 1, the fuel cell 10B (Comparative Example 2) comprising twenty stacked electric cells 1 was fabricated as shown in FIG. 1. In addition, a sealant was interposed between the fuel electrode channel member 3 and the fuel electrode of the electric cell 1, between the fuel electrode channel member 3 and the air electrode channel member 2' (Comparative Example 1), and between the fuel electrode channel member 3 and the air electrode channel member 2" (Comparative Example 2). Thickness of the fuel cell 10A (Comparative Example 1) became about 37 mm and thickness of the fuel cell 10B (Comparative Example 2) became about 42 mm.

Each of the fuel cells 10A (Comparative Example 1), 10B (Comparative Example 2) obtained was covered with a package 6 as shown in FIG. 7, and an air fan 7 (manufactured by Sanyo Denki Co., Ltd., model number: 109BC12HA7) was mounted on the edge part of the package 6.

Evaluation of Fuel Cell

Methanol (3 mass %) fuel was supplied to the fuel cells 10A (Comparative Example 1), 10B (Comparative Example 2) obtained by a pump (manufactured by Enomoto Micro Pump Mfg. Co., Ltd., model number: CM-15W-12) and the air was supplied by the fan 7 so as to conduct a power generation test. As the result, output of the fuel cell 10A (Comparative Example 1) was measured, at extremely early period from the beginning of power generation, as about 5 W, but after that the output drastically decreased and finally became almost zero. Also output of the fuel cell 10B (Comparative Example 2) was measured, at extremely early period from the beginning of power generation, as about 8 W, but after that the output drastically decreased and finally constant output became about 3.5 W. Power consumption of the fuel pump was measured as 1 W, and power consumption of the air fan was measured as 2.2 W so that output of the cell system was calculated as almost zero.

COMPARATIVE EXAMPLE 3

Manufacture of Fuel Cell

The current collecting plate (the complex of current collecting plate) 15 (the same one as used in Example 2) was prepared and the current collecting plate module 18 was fabricated according to the same procedure as used in Example 2 (MEA 4 was sandwiched by the current collecting plate (complex) 15).

Next, a fuel electrode channel member 3 (the same one as used in Example 2) and an air electrode channel member 2''' (similar one as used in Example 2) were made of an acrylic polymer. Depth of the channel part 2B (thickness of the air electrode channel members 2''') was set to be 1 mm. As the other specifications (width of the channel part 2B (top and bottom direction in FIG. 5A), length of the channel part 2B (left and right direction in FIG. 5A), pitch of the channel part 2B, and the number of the channel parts 2B per one of the air electrode channel members 2'''), the same ones as used in Example 1 were applied.

By use of obtained the collecting module 18, the air electrode channel member 2''' and the fuel electrode channel member 3, and according to the same procedure as used in Example 2, the fuel cell 10C (Comparative Example 3) comprising four current collecting plate modules 18 stacked (series-connected), and twenty electric cells 1 as a whole, was fabricated.

In this fuel cell, a distance between the air electrodes (thickness of the air electrode channel member 2''') became 1 mm, a distance between the fuel electrodes (thickness of the fuel electrode channel member 3) became 0.5 mm, and thickness of the fuel cell composed of (series-connected) twenty stacked cells became about 9.5 mm.

The whole of the fuel cell was covered with a package 6 similar to the one used in Example 1, and an air fan 7 (manufactured by Sanyo Denki Co., Ltd., model number: 109BC12HA7) was mounted on the edge part of the package 6.

Evaluation of Fuel Cell

Methanol (3 mass %) fuel was supplied to the fuel cell 10C (Comparative Example 3) obtained, by a pump (manufactured by Enomoto Micro Pump Mfg. Co., Ltd., model number: CM-15W-12) and the air was supplied by the fan 7 so as to conduct a power generation test. As the result, output of the fuel cell 10C (Comparative Example 3) was measured, at extremely early period from the beginning of power generation, as about 17.6 W, but after several minutes the output gradually decreased. Finally output behavior became unstable as changing in range of 5 to 10 W.

It can be considered that results of Comparative Examples 1 to 3 were caused by complexly affecting various factors, such as blockage of the air electrode channel by production water produced by power generation, reduction of the cross sectional area in the air electrode channel part, and application of air fan of low electric power consumption (generally the air fan of low electric power consumption has low static pressure). In other words, in order to achieve the object of the invention that high output of power generation is actualized by reducing pressure loss at an air electrode channel (an oxidant gas channel) during the power generation and using a supply device (e.g., an air fan) of small electric power consumption, it is preferable that a cross sectional area of the air electrode channel part is not less than 1.2 mm$^2$ (more preferably not less than 1.5 mm$^2$), and a distance between the air electrodes (the oxidant electrodes) is not less than 1.2 mm (more preferably not less than 1.5 mm).

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

For example, although DMFCs are explained in the embodiments, the invention can be also applied to PEFCs using hydrogen gas as a fuel.

What is claimed is:

1. A fuel cell, comprising:

a fuel electrode and an oxidant electrode disposed to sandwich a solid polymer electrolyte membrane;

current collecting plates disposed outside of the fuel electrode and the oxidant electrode;

a fuel electrode channel member disposed outside of the current collecting plate disposed outside of the fuel electrode; and an oxidant electrode channel member disposed outside of the current collecting plate disposed outside of the oxidant electrode, wherein the fuel electrode and the oxidant electrode are repeatedly stacked such that the fuel electrodes are opposed to each other while sandwiching the fuel electrode channel member and the oxidant electrodes are opposed to each other while sandwiching the oxidant electrode channel member, the current collecting plate comprises a collecting surface comprising a collecting part comprising plural through-holes, and an insulating surface to function as an electrical insulation, and the collecting surface opposed to the fuel electrode or the oxidant electrode and the insulating surface opposed to the fuel electrode channel member or the oxidant electrode channel member, the fuel electrode channel member and the oxidant electrode channel member each allow a fuel and an oxidant to be supplied to the fuel electrode and the oxidant electrode, respectively, through the through-holes of the current collecting plate, and the oxidant electrode channel member comprises a thickness of not less than 1.2 mm, wherein the oxidant electrode channel member comprises a comb-teeth shape to define an oxidant electrode channel, the comb-teeth shape is exposed and opened to outside at its both edges to allow the oxidant to enter and exit the oxidant electrode channel, and the oxidant electrode channel member comprises two or more openings at each of its both edges.

2. The fuel cell according to claim 1, wherein:

the oxidant electrode channel member comprises the oxidant electrode channel to supply the oxidant to the opposed oxidant electrodes, and the oxidant electrode channel comprises a cross-section area of not less than 1.2 mm$^2$ per one of the oxidant electrode channel part.

3. The fuel cell according to claim 1, wherein:

the oxidant electrode channel member comprises a through-hole in its thickness direction to define a channel for the oxidant, and an opening part that communicates with the through-hole to allow the oxidant to enter and exit the channel for the oxidant.

4. The fuel cell according to claim 2, wherein:

the oxidant electrode channel member comprises a through-hole in its thickness direction to define a channel for the oxidant, and an opening part that communicates with the through-hole to allow the oxidant to enter and exit the channel for the oxidant.

5. The fuel cell according to claim 1, wherein:

the oxidant electrode channel member comprises a rectangle shape in its outermost form, and the oxidant electrode channel member comprises a channel for the oxidant formed parallel to a short side of the rectangle shape.

6. The fuel cell according to claim 1, wherein:

the fuel electrode channel member comprises a through-hole in its thickness direction to define a channel for the fuel, and an opening part that communicates with the through-hole to allow the fuel to enter and exit the channel for the fuel.

7. The fuel cell according to claim 1, wherein:

the current collecting plate comprises plural metal plates and an insulating sheet of a polymer resin laminated on both surfaces of the metal plate, and the plural current collecting plates are arrayed on a same plane while being disposed at an interval on the insulating sheet.

8. The fuel cell according to claim 7, wherein:

the plural current collecting plates arrayed are folded at a connecting part such that they are stacked while sandwiching the fuel electrode and the oxidant electrode therebetween.

9. The fuel cell according to claim 7, wherein:

the plural current collecting plates arrayed are folded at a connecting part such that they are stacked while sandwiching the fuel electrode channel member or the oxidant electrode channel member therebetween.

10. The fuel cell according to claim 1, wherein:

the fuel cell is placed in a package comprising an air fan.

11. The fuel cell according to claim 1, wherein:

the fuel cell is a direct methanol type fuel cell.

12. The fuel cell according to claim 1, wherein an outer surface of the oxidant electrode channel is in plane-contact with an adjacent member.

* * * * *